(12) United States Patent
Yang et al.

(10) Patent No.: US 11,988,931 B2
(45) Date of Patent: May 21, 2024

(54) DISPLAY MODULE AND MANUFACTURING METHOD THEREFOR, AND DISPLAY DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Jie Yang, Beijing (CN); Yan Wang, Beijing (CN); Xinya Zhang, Beijing (CN); Zhe Li, Beijing (CN); Li Tian, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/908,426

(22) PCT Filed: Sep. 2, 2021

(86) PCT No.: PCT/CN2021/116326
§ 371 (c)(1),
(2) Date: Aug. 31, 2022

(87) PCT Pub. No.: WO2022/083312
PCT Pub. Date: Apr. 28, 2022

(65) Prior Publication Data
US 2023/0341734 A1    Oct. 26, 2023

(30) Foreign Application Priority Data
Oct. 19, 2020    (CN) .......................... 202011120244.5

(51) Int. Cl.
*G02F 1/1333*    (2006.01)
*G02F 1/1362*    (2006.01)

(52) U.S. Cl.
CPC .. *G02F 1/136295* (2021.01); *G02F 1/136209* (2013.01); *G02F 1/136222* (2021.01)

(58) Field of Classification Search
CPC ...................................................... G02F 1/133
See application file for complete search history.

(56) References Cited

U.S. PATENT DOCUMENTS 6,268,092 B1 *    7/2001    Akashi .............. G02F 1/133516
                                                               430/7
2007/0146259 A1 *    6/2007    Jin ...................... G02F 1/13471
                                                               345/87

(Continued)

FOREIGN PATENT DOCUMENTS

CN    107123745 A    9/2017
CN    108983515 A    12/2018

(Continued)

OTHER PUBLICATIONS

PCT International Search Report (w/ English translation) and Written Opinion for corresponding PCT Application No. PCT/CN2021/116326, mailed Dec. 8, 2021, 13 pages.

*Primary Examiner* — Sang V Nguyen
(74) *Attorney, Agent, or Firm* — Dority & Manning, P.A.

(57) ABSTRACT

A display module includes a display panel and a dimming panel stacked on the display panel. The display panel has a plurality of pixel regions. The dimming panel has a plurality of dimming regions, and in a direction perpendicular to the display panel, a dimming region covers at least one pixel region. The dimming panel includes a plurality of dimming electrodes and a plurality of signal lines. Each dimming electrode is located in a dimming region in the plurality of dimming regions, and any two adjacent dimming electrodes have a gap therebetween. Each dimming electrode directly electrically connected to at least one signal line. The at least one signal line is configured to transmit a control voltage (Continued)

signal to the dimming electrode electrically connected to the at least one signal line for controlling a transmittance of the dimming region where the dimming electrode is located.

15 Claims, 18 Drawing Sheets

(56) References Cited

U.S. PATENT DOCUMENTS

| | | | |
|---|---|---|---|
| 2007/0236414 A1* | 10/2007 | Lin | G02F 1/134309 345/60 |
| 2011/0310337 A1 | 12/2011 | Ishihara et al. | |
| 2014/0293188 A1 | 10/2014 | Chen et al. | |
| 2015/0049288 A1 | 2/2015 | Yeh et al. | |
| 2016/0093252 A1 | 3/2016 | Harada et al. | |
| 2018/0157096 A1* | 6/2018 | Guo | G02F 1/136209 |
| 2018/0299726 A1 | 10/2018 | Oka et al. | |
| 2018/0341132 A1 | 11/2018 | Suzuki | |
| 2019/0121193 A1* | 4/2019 | Ono | G02F 1/017 |
| 2019/0129225 A1 | 5/2019 | Lee et al. | |
| 2019/0243175 A1 | 8/2019 | Newton | |
| 2020/0264484 A1* | 8/2020 | Jinnai | H01L 27/124 |
| 2020/0292894 A1* | 9/2020 | Liu | G02F 1/13306 |
| 2020/0355951 A1 | 11/2020 | Chen et al. | |
| 2021/0048716 A1* | 2/2021 | Cheng | G02F 1/13439 |
| 2021/0408203 A1* | 12/2021 | Shi | H10K 59/353 |

FOREIGN PATENT DOCUMENTS

| | | |
|---|---|---|
| CN | 109239995 A | 1/2019 |
| CN | 109713159 A | 5/2019 |
| CN | 109828417 A | 5/2019 |
| CN | 109960082 A | 7/2019 |
| CN | 110286533 A | 9/2019 |
| CN | 110568684 A | 12/2019 |
| CN | 110673381 A | 1/2020 |
| CN | 110673412 A | 1/2020 |
| CN | 111123592 A | 5/2020 |
| CN | 211149139 U | 7/2020 |
| CN | 213987120 U | 8/2021 |
| EP | 3252752 A2 | 12/2017 |
| WO | WO 2008/053724 A1 | 5/2008 |
| WO | WO 2018/178795 A1 | 10/2018 |

* cited by examiner

DISPLAY MODULE AND MANUFACTURING METHOD THEREFOR, AND DISPLAY DEVICE

CROSS-REFERENCE TO RELATED APPLICATIONS

This application is a national phase entry under 35 USC 371 of International Patent Application No. PCT/CN 2021/116326 filed on Sep. 2, 2021, which claims priority to Chinese Patent Application No. 202011120244.5, filed on Oct. 19, 2020, which are incorporated herein by reference in their entirety.

TECHNICAL FIELD

The present disclosure relates to the field of display technologies, and in particular, to a display module and a manufacturing method therefor, and a display device.

BACKGROUND

At present, high dynamic range (HDR) technology is widely applied to large-sized display devices such as televisions (TV), so that the display devices have a high contrast (also referred to as contrast ratio, CR).

In the related art, the high dynamic range technology has two implementations, one is a backlight unit (Mini LED BLU) technology, and the other is a dual-layer panel (Panel BD Cell) technology. The backlight unit technology may realize multi-zone dimming of a display device. However, a backlight unit has a large number of LED lamps and a low yield, which results in a large thickness and a high manufacturing cost of the display device, Compared with the backlight unit technology, the dual-layer panel technology may realize multi-zone dimming of a display device, and reduce a thickness and a manufacturing cost of the display device, and becomes one of development directions in the field of display technologies.

SUMMARY

In an aspect, a display module is provided. The display module includes a display panel and a dimming panel stacked on the display panel. The display panel has a plurality of pixel regions. The dimming panel has a plurality of dimming regions. A dimming region covers at least one pixel region in a direction perpendicular to the display panel. The dimming panel includes a plurality of dimming electrodes and a plurality of signal lines. Each dimming electrode is located in a dimming region in the plurality of dimming regions, and any two adjacent dimming electrodes have a gap therebetween. Each dimming electrode is directly electrically connected to at least one signal line. The at least one signal line is configured to transmit a control voltage signal to the dimming electrode electrically connected to the at least one signal line for controlling a light transmittance of the dimming region where the dimming electrode is located.

In some embodiments, the plurality of dimming electrodes are arranged in an array. A row direction in which the plurality of dimming electrodes are arranged is a first direction, and a column direction in which the plurality of dimming electrodes are arranged is a second direction.

Each signal line extends as a whole in the second direction, and the plurality of signal lines are arranged side by side in the first direction. An orthographic projection of each signal line on the display panel is at least partially overlapped with an orthographic projection, on the display panel, of a column of dimming electrodes where a corresponding dimming electrode to which the signal line is electrically connected is located.

In some embodiments, the signal line includes a plurality of portions connected in sequence, and is in a shape of a broken line. Every two adjacent portions constitute a bending unit. In the direction perpendicular to the display panel, the dimming electrode covers a plurality of bending units in the at least one signal line.

In some embodiments, in the first direction, the bending unit passes through 1 to 6 pixel regions. In the second direction, the bending unit passes through 1 to 6 pixel regions.

In some embodiments, the dimming panel further includes first light-shielding patterns. An orthographic projection of a first light-shielding pattern in the first light-shielding patterns on the display panel is located between orthographic projections of two adjacent columns of dimming electrodes on the display panel. The first light-shielding pattern extends as a whole in the second direction. The first light-shielding patterns and the signal line are made of a same material, and are arranged in a same layer.

In some embodiments, in a case where the signal line is in the shape of the broken line, an edge contour of the dimming electrode extending in the second direction is in a shape of a broken line that is same as the shape of the signal line, and the edge contour and the signal line are parallel to each other. In the first direction, edge contours, proximate to each other, of two adjacent dimming electrodes have complementary shapes.

The first light-shielding pattern is in a shape of a broken line that is same as the shape of the edge contour of the dimming electrode extending in the second direction, and the first light-shielding pattern and the edge contour are parallel to each other.

In some embodiments, the dimming panel further includes second light-shielding patterns. An orthographic projection of a second light-shielding pattern in the second light-shielding patterns on the display panel is located between orthographic projections of two adjacent rows of dimming electrodes on the display panel. The second light-shielding pattern extends as a whole in the first direction, and is disconnected at a position where the second light-shielding pattern and the signal line intersect. The second light-shielding patterns and the signal line are made of a same material, and are arranged in a same layer.

In some embodiments, the dimming panel further includes a driving chip disposed on a side of the plurality of dimming electrodes and directly electrically connected to the plurality of signal lines. The driving chip is configured to supply a control voltage signal to the plurality of signal lines, so as to control a light transmittance of a dimming region where a dimming electrode to which each signal line is electrically connected is located.

In some embodiments, the dimming panel further includes a first passivation layer disposed between the plurality of dimming electrodes and the plurality of signal lines. The first passivation layer has a plurality of first vias, and each signal line is electrically connected to a corresponding dimming electrode through at least one first via.

In some embodiments, in a case where the signal line includes a plurality of portions connected in sequence, and is in a shape of a broken line, an orthographic projection of a first via in the at least one via on the display panel is located at an intersection of orthographic projections of two adjacent portions on the display panel.

In some embodiments, a line width of the signal line is in a range of 2.2 μm to 3.0 μm, inclusive.

In some embodiments, the display panel includes a first substrate and a second substrate arranged opposite to each other, a plurality of pixel driving circuits disposed on a side of the first substrate facing the second substrate, and a color filter layer and a black matrix pattern that are disposed on a side of the second substrate facing the first substrate.

The dimming panel further includes a third substrate located on a side of the second substrate away from the first substrate and arranged opposite to the second substrate. The plurality of dimming electrodes and the plurality of signal lines are disposed on a side of the third substrate facing the second substrate, or are disposed on a side of the second substrate facing the third substrate.

The dimming panel and the display panel share the second substrate. An orthographic projection of the black matrix pattern on the second substrate covers an orthogonal projection of the gap between any two adjacent dimming electrodes on the second substrate.

In some embodiments, the dimming panel further includes a reference electrode disposed on one of the second substrate and the third substrate, An orthographic projection of the reference electrode on the second substrate is overlapped with an orthographic projection of each dimming electrode on the second substrate. The reference electrode is configured to transmit a reference voltage signal, so that an electric field is generated between the reference electrode and each dimming electrode.

In some embodiments, the reference electrode is disposed on a different substrate from the plurality of dimming electrodes.

Alternatively, the reference electrode and the plurality of dimming electrodes are disposed on a same substrate. The reference electrode is farther from the substrate where the reference electrode and the plurality of dimming electrodes are located than the plurality of dimming electrodes. Each dimming electrode directly faces a portion of the reference electrode, and this portion of the reference electrode has a plurality of slits.

Alternatively, the reference electrode and the plurality of dimming electrodes are disposed on the same substrate. The reference electrode is closer to the substrate where the reference electrode and the plurality of dimming electrodes are located than the plurality of dimming electrodes. Each dimming electrode has a plurality of slits.

In some embodiments, a width of the gap between the plurality of dimming electrodes is in a range of 3.0 μm to 3.5 μm, inclusive.

In some embodiments, a width of a portion of the black matrix pattern that is opposite to the gap is in a range of 4 μm to 6 μm, inclusive.

In some embodiments, the display module further includes a first polarizer disposed on a side of the first substrate away from the second substrate, a metal wire grid polarizing layer disposed on the side of the second substrate away from the first substrate, and a second polarizer disposed on a side of the third substrate away from the first substrate. Directions of absorption axes of the first polarizer and the second polarizer are perpendicular to a direction of an absorption axis of the metal wire grid polarizing layer.

In some embodiments, in a case where the plurality of dimming electrodes are disposed on the second substrate, and the reference electrode is disposed on the third substrate, the metal wire grid polarizing layer is located between the second substrate and the plurality of dimming electrodes. In a case where the reference electrode is disposed on the second substrate, and the plurality of dimming electrodes are disposed on the third substrate, the metal wire grid polarizing layer is located between the second substrate and the reference electrode.

In a case where the plurality of dimming electrodes and the reference electrode are all disposed on the second substrate, and the plurality of dimming electrodes are closer to the second substrate than the reference electrode, the metal wire grid polarizing layer is located between the second substrate and the plurality of dimming electrodes.

In a case where the plurality of dimming electrodes and the reference electrode are all disposed on the second substrate, and the reference electrode is closer to the second substrate than the plurality of dimming electrodes, the metal wire grid polarizing layer is located between the second substrate and the reference electrode.

In another aspect, a display device is provided. The display device includes the display module in any one of the above embodiments, and a backlight module disposed on a side of the dimming panel away from the display panel. The backlight module is configured to provide light for the display module.

In yet another aspect, a manufacturing method of a display module is provided. The manufacturing method includes following steps. A plurality of pixel driving circuits are formed on a first substrate.

A color filter layer and a black matrix pattern are formed on a second substrate.

The first substrate on which the plurality of pixel driving circuits are formed is assembled with the second substrate on which the color filter layer and the black matrix pattern are formed, so as to form a display panel. The display panel has a plurality of pixel regions.

A plurality of dimming electrodes and a plurality of signal lines are formed on a third substrate or on a side of the second substrate away from the first substrate.

The third substrate is assembled with the display panel to form a dimming panel. The third substrate is located on the side of the second substrate away from the first substrate. The dimming panel and the display panel share the second substrate. The dimming panel has a plurality of dimming regions, and in a direction perpendicular to the display panel, a dimming region covers at least one pixel region. Each dimming electrode is located in a dimming region in the plurality of dimming regions, and any two adjacent dimming electrodes have a gap therebetween. Each dimming electrode is directly electrically connected to at least one signal line. The at least one signal line is configured to transmit a control voltage signal to the dimming electrode electrically connected to the at least one signal line for controlling a light transmittance of the dimming region where the dimming electrode is located.

In some embodiments, in a case where the plurality of dimming electrodes and the plurality of signal lines are formed on the third substrate, the manufacturing method further includes: before assembling the third substrate with the display panel, forming a reference electrode on the side of the second substrate away from the first substrate.

In a process of assembling the third substrate with the display panel, an orthographic projection of the black matrix pattern on the second substrate covers an orthogonal projection of the gap between any two adjacent dimming electrodes on the second substrate.

In some embodiments, in a case where the plurality of dimming electrodes and the plurality of signal lines are formed on the side of the second substrate away from the first substrate, the manufacturing method further includes: before assembling the third substrate with the display panel, forming a reference electrode on a side of the third substrate.

In a process of forming the plurality of dimming electrodes on the side of the second substrate away from the first substrate, an orthographic projection of the black matrix pattern on the second substrate covers an orthogonal projection of the gap between any two adjacent dimming electrodes on the second substrate.

In some embodiments, before assembling the third substrate with the display panel, the manufacturing method further includes: forming a metal wire grid polarizing layer on the side of the second substrate away from the first substrate by a patterning process; and forming an insulating layer on a side of the metal wire grid polarizing layer away from the first substrate.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method, and an actual timing of a signal involved in the embodiments of the present disclosure.

DETAILED DESCRIPTION

Figure 1:
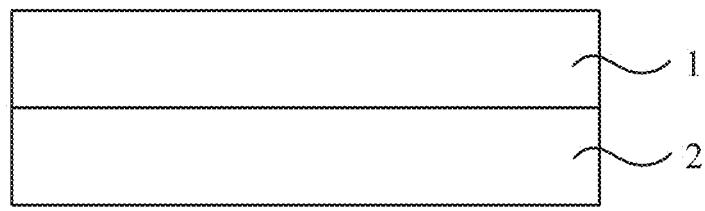
FIG. 1 is a schematic structural diagram of a display module, in accordance with the related art.

Technical solutions in some embodiments of the present disclosure will be described dearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "an example," "specific example" or "some examples" are intended to indicate that specific features, structures, materials or characteristics related to the embodiment(s) or example(s) are included in at least one embodiment or example of the present disclosure, Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the term "electrically connected" and derivatives thereof may be used. For example, the term "electrically connected" may be used in the description of some embodiments to indicate that two or more components are in direct physical or electrical contact with each other. The embodiments disclosed herein are not necessarily limited to the contents herein.

The phrase "A and/or B" includes following three combinations: only A, only B, and a combination of A and B.

The use of the phrase "configured to" herein means an open and inclusive expression, which does not exclude devices that are applicable to or configured to perform additional tasks or steps.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing techniques and/or tolerances may be envisaged. Therefore, the exemplary embodiments should not be construed to be limited to the shapes of regions shown herein, but to include deviations in shape due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

In the related art, as shown in FIG. 1, a display module 100 includes a display panel 1 and a dimming panel 2 that are stacked. The dimming panel 2 is aligned with and adhered to the display panel 1 to realize the assembly of the dimming panel 2 and the display panel 1. A backlight module may be provided on a side of the dimming panel 2 in the display module 100 away from the display panel 1, and light emitted from the backlight module passes through the dimming panel 2 and the display panel 1 in sequence. The dimming panel 2 is configured to zonally modulate the light passing through itself and incident on the display panel 1. The display panel 1 is configured to display a screen.

In order to realize the zonal modulation of a backlight brightness by the dimming panel 2, each dimming region in the dimming panel 2 is provided with a dimming electrode and a driving circuit electrically connected to the dimming electrode. The driving circuit is configured to transmit a control voltage signal to the dimming electrode electrically connected thereto for controlling a light transmittance of a dimming region where the dimming electrode is located. That is, the dimming panel 2 is actively driven. However, since the driving circuit includes light-tight structures such as thin film transistors and metal signal lines, a light transmittance of the dimming panel 2 is reduced, which affects the display effect of the display module 100.

Figure 2:
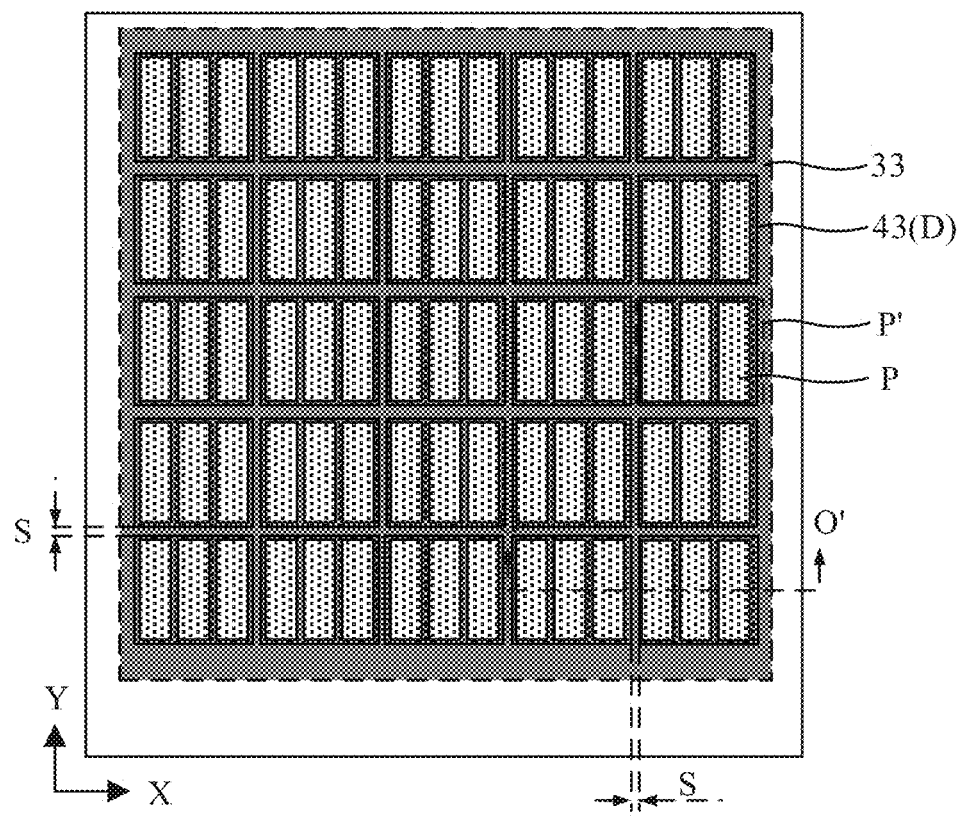
FIG. 2 is a top view of a display module, in accordance with some embodiments of the present disclosure.
Figure 3:
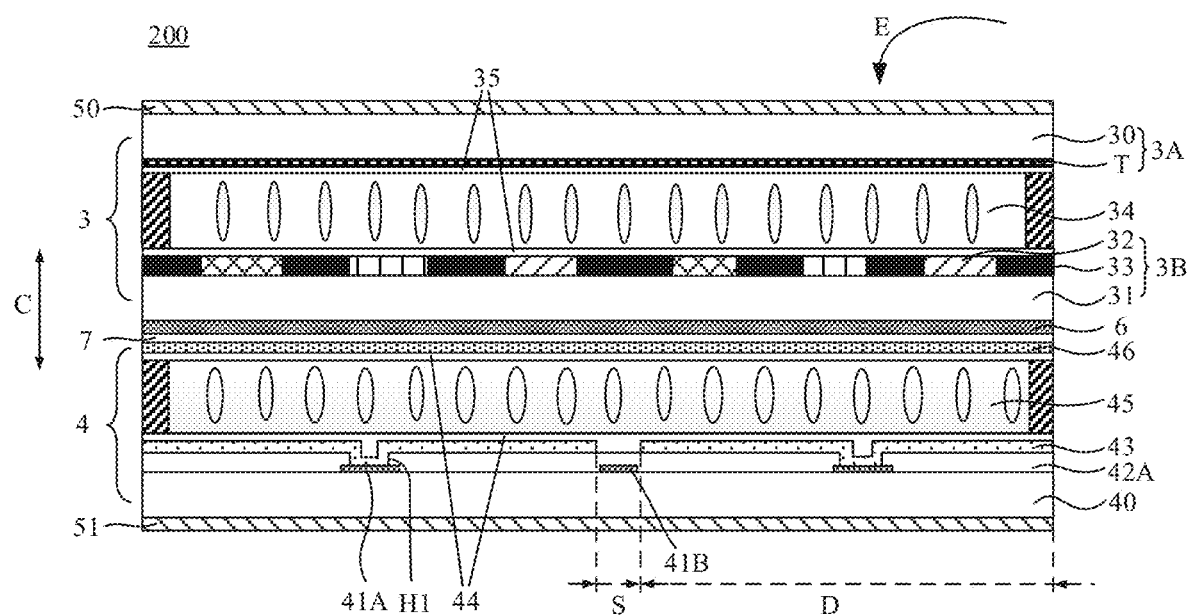
FIG. 3 is a partial sectional view taken along the O-O' section line in FIG. 2.

To solve the above problem, some embodiments of the present disclosure provide a display module. As shown in FIGS. 2 and 3, the display module 200 includes a display panel 3 and a dimming panel 4 stacked on the display panel 3.

Figure 4:
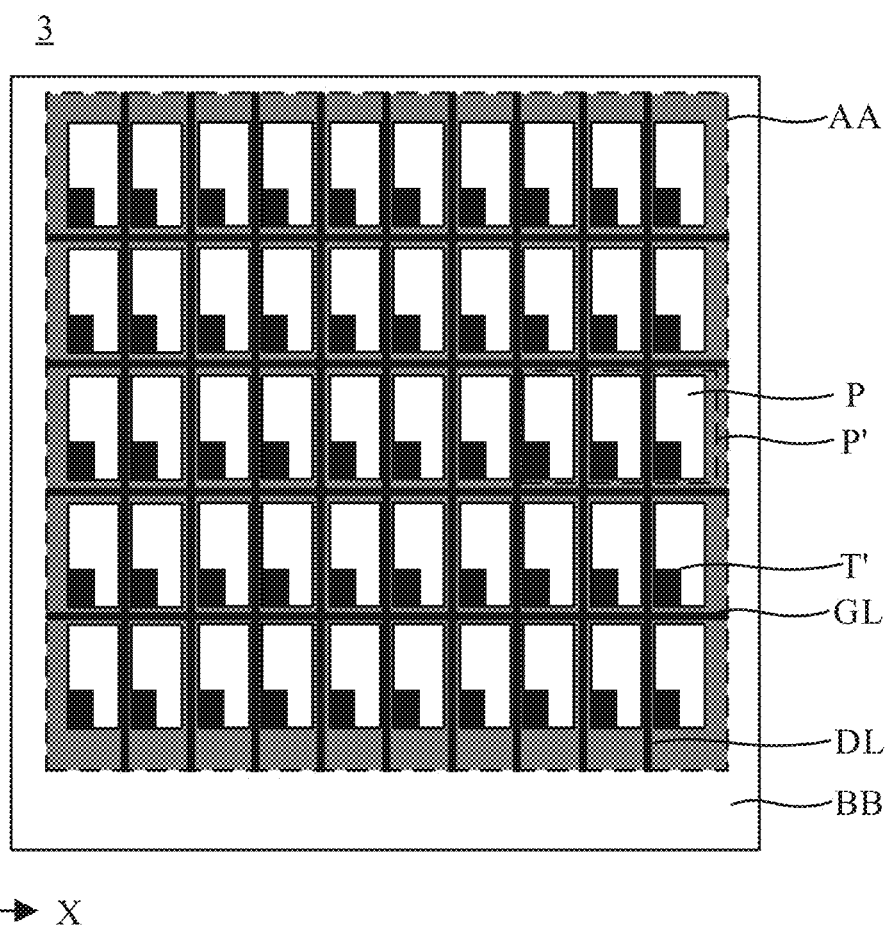
FIG. 4 is a top view of a display panel, in accordance with some embodiments of the present disclosure.
Figure 5:
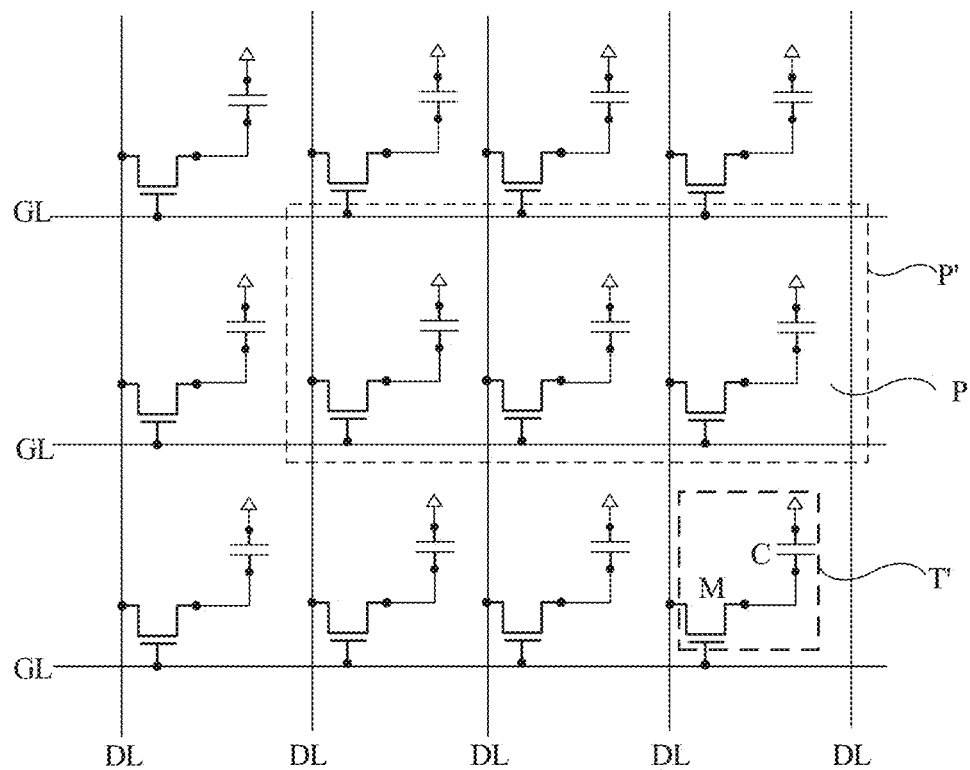
FIG. 5 is a pixel architecture diagram of a display panel, in accordance with some embodiments of the present disclosure.

The display panel 3 is configured to display image(s). As shown in FIGS. 4 and 5, the display panel 3 has a display area AA (i.e., active area, AA; also referred to as effective display area) and a peripheral area BB located on at least one side of the display area AA. The display area AA of the display panel 3 includes a plurality of sub-pixel regions P, and each sub-pixel region P is provided with a sub-pixel therein. The display area AA is further provided with a plurality of gate scan signal lines (i.e., gate lines) GL extending in a row direction X in which the plurality of sub-pixel regions P are arranged, and a plurality of data signal lines (i.e., data lines) DL extending in a column direction Y in which the plurality of sub-pixel regions P are arranged.

For the convenience of description, a description will be made in an example where the plurality of sub-pixel regions P are arranged in a matrix, and sub-pixels respectively located in the plurality of sub-pixel regions P are arranged in a matrix. In this case, sub-pixels arranged in a line in the row direction X are referred to as a row of sub-pixels, and sub-pixels arranged in a line in the column direction Y are referred to as a column of sub-pixels. A row of sub-pixels may be connected to a gate scan signal line GL, and a column of sub-pixels may be connected to a data signal line DL. A pixel driving circuit T' is provided in a sub-pixel region P, and is used for making this sub-pixel realize display.

The pixel driving circuit T' in the sub-pixel region P will be exemplarily described below.

As shown in FIG. 5, the pixel driving circuit T' includes a thin film transistor M and a liquid crystal capacitor C. Two electrode plates of the liquid crystal capacitor C are formed by a pixel electrode and a common electrode, respectively. A gate of the thin film transistor M is connected to a gate line GL, a first electrode of the thin film transistor M is connected to a data line DL, and a second electrode of the thin film transistor M is connected to the liquid crystal capacitor C. The thin film transistor M is used for transmitting a data signal of the data line DL to the liquid crystal capacitor C.

At least two sub-pixels constitute a pixel, and sub-pixel regions P where at least two sub-pixels included in a pixel are respectively located constitute a pixel region P'. As shown in FIGS. 2 and 4, in the row direction X in which the plurality of sub-pixel regions P are arranged, every three sub-pixels constitute a pixel. Three sub-pixels included in a pixel may be a red sub-pixel, a green sub-pixel and a blue sub-pixel, respectively. Accordingly, sub-pixel regions P where three sub-pixels included in a pixel are respectively located constitute a pixel region P'.

Figure 6A:
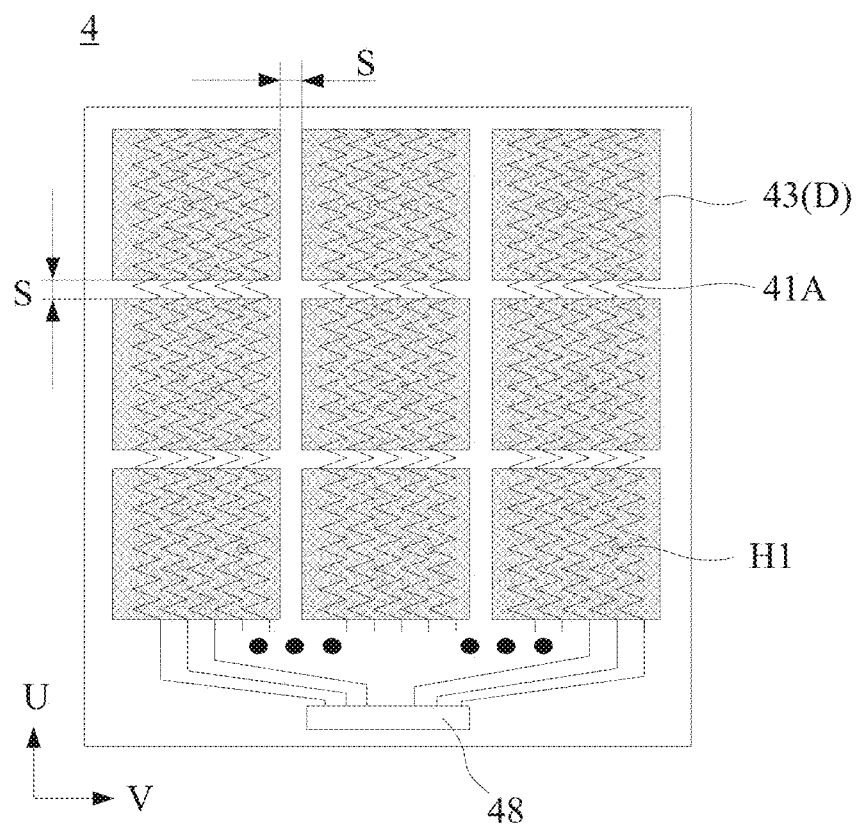
FIG. 6A is a top view of a dimming panel, in accordance with some embodiments of the present disclosure.

As shown in FIGS. 2, 3 and 6A, the dimming panel 4 has a plurality of dimming regions D. In a direction C perpendicular to the display panel 3, a dimming region D covers at least one pixel region P'. FIG. 2 shows that a dimming region D covers a pixel region P'. The dimming panel 4 is configured to adjust a light transmittance of each dimming region D through which light passes toward the display panel 3. That is, the dimming panel 4 has a function of local dimming, so that a display image of the display module 200 has a high contrast.

For example, in the direction C perpendicular to the display panel 3, a dimming region D covers a pixel region P' or at least two pixel regions P'. For example, in a case where a resolution of the display panel 3 is 3840×2160, and a size of a pixel region P' is 90 μm×90 μm, the resolution is 3840×2160, which indicates that there are 3840 pixels in a row direction in which a plurality of pixel regions P' constituted by the plurality of sub-pixel regions P are arranged (i.e., the row direction X in which the plurality of sub-pixel regions P are arranged), and there are 2160 pixels in a column direction in which the plurality of pixel regions P' are arranged (i.e., the column direction Y in which the plurality of sub-pixel regions P are arranged). A dimming region D may be set to cover 80×80 pixel regions P'. In this way, the number of the dimming regions D is $$\frac{3840}{80} \times \frac{2160}{80} = 1296,$$

so that a requirement for the local dimming of the dimming panel 4 may be met, thereby improving the contrast of the display image of the display module 200.

It will be noted that in the above expression, the size of the pixel region P' is 90 μm×90 μm, which means that a dimension of the pixel region P' is 90 μm in the row direction in which the plurality of pixel regions P' are arranged, and a dimension of the pixel region P' is 90 μm in the column direction in which the plurality of pixel regions P' are arranged.

Figure 7:
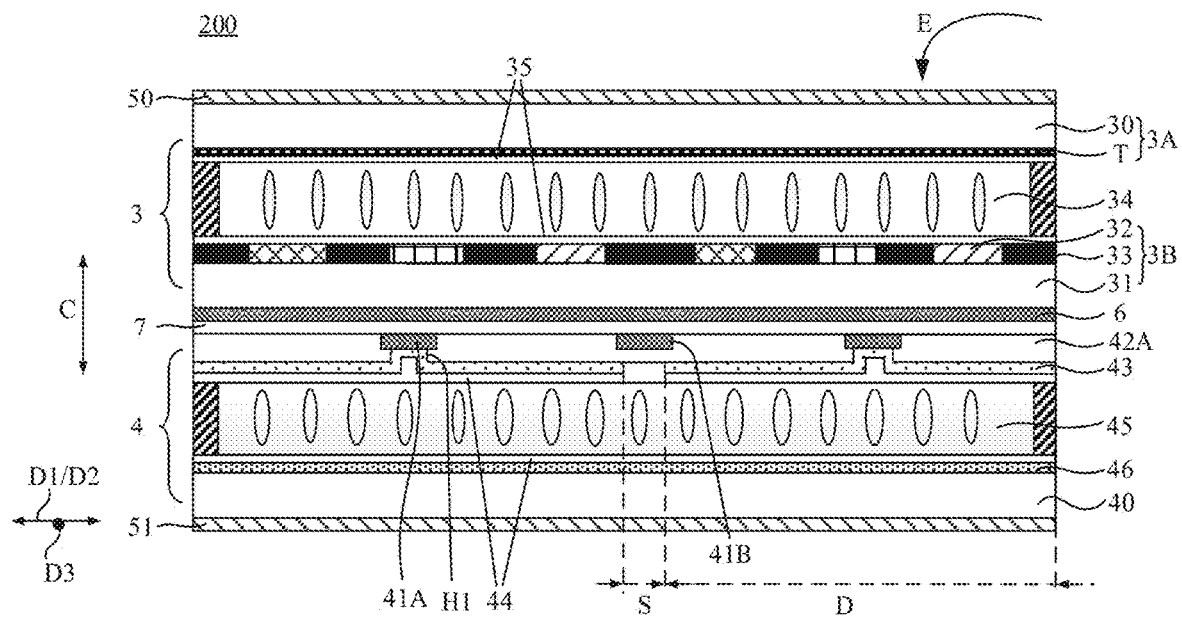
FIG. 7 is a partial sectional view of a display module, in accordance with some embodiments of the present disclosure.

As shown in FIGS. 3 and 7, the dimming panel 4 includes a plurality of dimming electrodes 43 and a plurality of signal lines 41A.

A dimming electrode 43 is located in a dimming region D, and any two adjacent dimming electrodes 43 have a gap S therebetween.

Each dimming electrode 43 is directly electrically connected to at least one signal line 41A. That is, the dimming panel 4 is passively driven. The signal line 41A is configured to transmit a control voltage signal to a dimming electrode 43 electrically connected thereto for controlling a light transmittance of a dimming region D where this dimming electrode 43 is located.

Compared with a conventional dimming panel that is actively driven, in the above embodiments of the present disclosure, the signal line 41A transmits the control voltage signal to the dimming electrode 43 electrically connected thereto for controlling the light transmittance of the dimming region D where this dimming electrode 43 is located, i.e., the dimming panel 4 is passively driven. Therefore, the dimming panel 4 does not need to be provided with a driving circuit, which avoids a reduction of a light transmittance of the dimming panel 4 due to the shielding of light by the driving circuit, so that the light transmittance of the dimming panel 4 is improved, and the display effect of the display module 200 is improved.

As shown in FIG. 6A, the plurality of dimming electrodes 43 are arranged in an array. A row direction in which the plurality of dimming electrodes 43 are arranged is a first direction V, and a column direction in which the plurality of dimming electrodes 43 are arranged is a second direction U.

Each signal line 41A extends generally in the second direction U, and the plurality of signal lines 41A are arranged side by side in the first direction V.

An orthographic projection of each signal line 41A on the display panel 3 is at least partially overlapped with an orthographic projection, on the display panel 3, of a column of dimming electrodes 43 where a dimming electrode 43 electrically connected to this signal line 41A is located, so that the dimming electrode 43 is electrically connected to the signal line 41A through via(s).

It will be noted that the first direction V and the second direction U may be perpendicular to each other. In this case, the first direction V may be the same as the row direction X in which the plurality of pixel regions P' are arranged, and the second direction U may be the same as the column direction Y in which the plurality of pixel regions P' are arranged.

It will be noted that each signal line 41A extends as a whole in the second direction U, which means that the signal line 41A has a tendency to extend as a whole in the second direction U. The signal line 41A may be straight, so that portions of the signal line 41A extend in the second direction U; or the signal line may be non-straight, such as a wavy line, a broken line, or a jagged line, so that portions of the signal line 41A may deviate from the second direction U, but the signal line 41A has the tendency to extend as a whole in the second direction U.

Figure 6B:
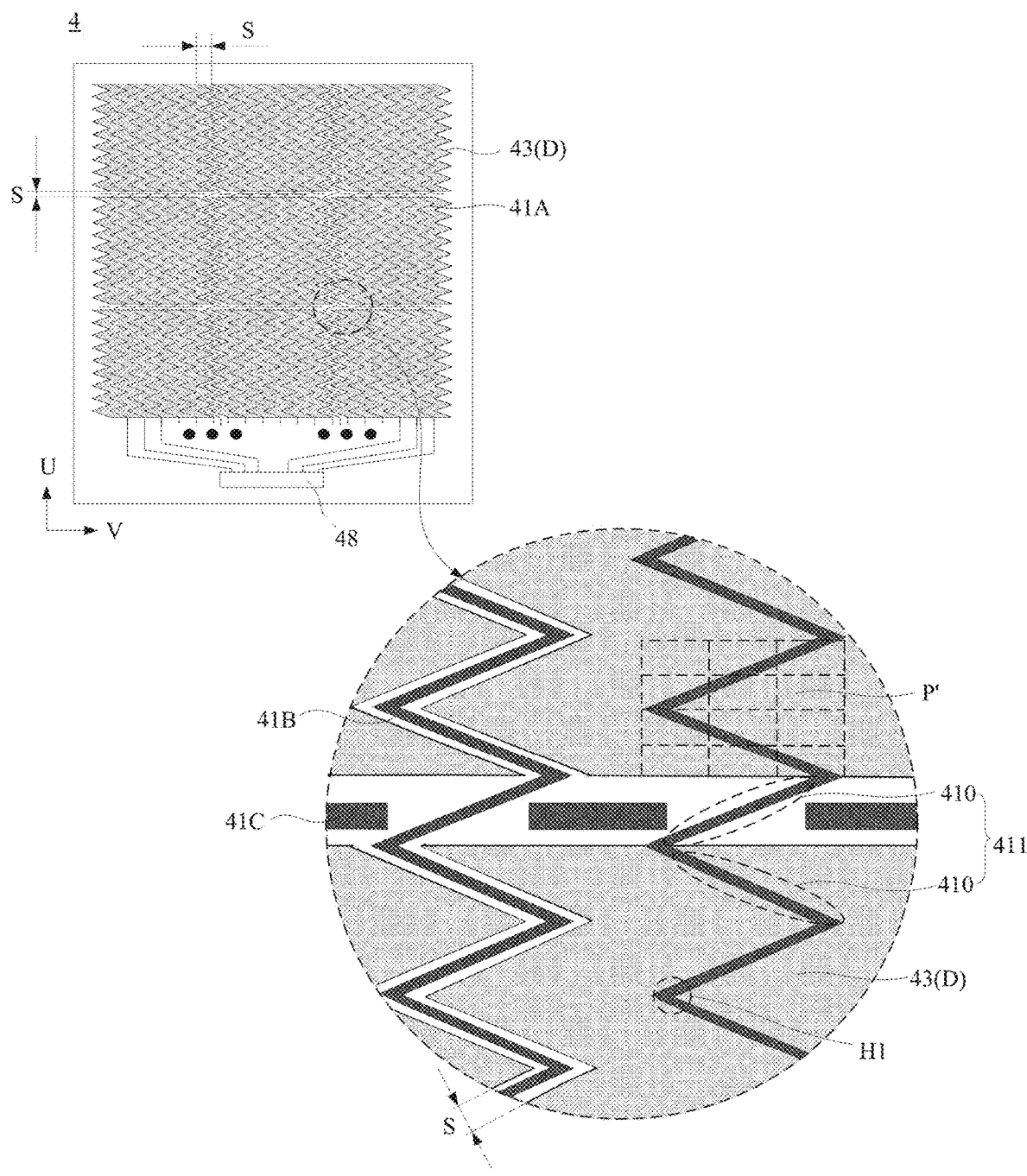
FIG. 6B is a top view of another dimming panel, in accordance with some embodiments of the present disclosure.

In some embodiments, as shown in FIGS. 6A and 6B, the signal line 41A includes a plurality of portions 410 connected in sequence, and the signal line 41A as a whole is a broken line. Moreover, in the signal line 41A, every two adjacent portions 410 constitute a bending unit 411. In the direction C perpendicular to the display panel 3, a dimming electrode 43 covers a plurality of bending units 411 in the signal line(s) 41A. Through the above design of the signal line 41A, a problem of moiré on a display screen may be solved.

In some embodiments, in each bending unit 411, a length and an inclination angle of a portion 410 may be set according to a size of the dimming electrode 43 and the number of bending units 411 covered by each dimming electrode 43 in the second direction U, Here, the inclination angle of the portion 410 refers to an included angle between the portion and the first direction V. The inclination angle of the portion 410 is less than 90°, which is, for example, in a range of 0° to 45°, such as 26° or 30°.

In some embodiments, as shown in FIG. 6B, in the first direction V, a bending unit 411 passes through 1 to 6 pixel regions P'. For example, a bending unit 411 may pass through 1, 2, 3, 4, 5 or 6 pixel regions P'.

In the second direction U, a bending unit 411 passes through 1 to 6 pixel regions P'. For example, a bending unit 411 may pass through 1, 2, 3, 4, 5 or 6 pixel regions P'. It can be seen that the signal line 41A may be designed in various ways.

Moiré simulation experiments were carried out on the signal line 41A with different designs, and experimental results are as shown in Table 1 below.

TABLE 1

| Split | Line width | Ratio (in the column direction Y) main:sub | Ratio (in the row direction X) main:sub | Moiré result |
|---|---|---|---|---|
| 1 | 2.2 | 1:2 | 1:2 | Severe |
| 2 | 3.5 | 1:2 | 1:2 | Severe |
| 3 | 3.5 | 1:4 | 1:3 | Slight |
| 4 | 2.2 | 1:4 | 1:3 | Slightest |
| 5 | 2.2 | 1:2 | 1:3 | Slight |

Here, the "split" refers to an example of a different design of the signal line 41A.

The "line width" refers to a line width of the signal line 41A.

The "ratio (in the column direction Y) main: sub" refers to a ratio of the number of each bending unit 411 (i.e., 1) to the number of pixel regions P' through which each bending unit 411 of the signal line 41A passes in the column direction Y (i.e., the second direction U) in which the plurality of pixel regions P' are arranged. For example, the ratio (in the column direction Y) main: sub is 1:2, which indicates that each bending unit 411 passes through two pixel regions P' in the column direction Y (i.e., the second direction U).

The "ratio (in the row direction X) main: sub" refers to a ratio of the number of each bending unit 411 (i.e., 1) to the number of pixel regions P' through which each bending unit 411 of the signal line 41A passes in the row direction X (i.e., the first direction V) in which the plurality of pixel regions P' are arranged. For example, the ratio (in the row direction X) main: sub is 1:3, which indicates that each bending unit 411 passes through three pixel regions P' in the row direction X (i.e., the first direction V).

The "moiré result" means that the moiré on the display screen is slight or severe under a different design of the signal line 41A.

It can be seen from Table 1 that in a case where the signal line 41A has the design of Split 4, i.e., in a case where the signal line 41A has the design in which the line width is 2.2 μm, the ratio (in the column direction Y) main: sub is 1:4, and the ratio (in the row direction X) main: sub is 1:3, the moiré on the display screen is slightest.

Moreover, comparing Split 3 and Split 4, it can be seen that in a case where the ratio (in the column direction Y) main: sub of Split 3 and the ratio (in the column direction Y) main: sub of Split 4 are the same, and the ratio (in the row direction X) main: sub of Split 3 and the ratio (in the row direction X) main: sub of Split 4 are the same, the smaller the line width of the signal line 41A is, the slighter the moiré on the display screen.

Therefore, in combination with the wiring design of split 4 in Table 1, in order to further solve the moiré problem on the display screen, in some embodiments of the present disclosure, the line width of the signal line 41A may be in a range of 2.2 μm to 3.0 μm, inclusive, such as 2.2 μm, 2.4 μm, 2.6 μm, 2.8 μm or 3.0 μm.

For example, as shown in FIG. 63, in the second direction U, the ratio of the number of each bending unit 411 of the signal line 41A to the number of the pixel regions P' through which the bending unit 411 passes is 1:4. That is, each bending unit 411 passes through 4 pixel regions P'. In the first direction V, the ratio of the number of each bending unit 411 of the signal line 41A to the number of the pixel regions P' through which the bending unit 411 passes is 1:3. That is, each bending unit 411 passes through 3 pixel regions P'.

In some embodiments, as shown in FIGS. 3, 6A, 6B and 7, the dimming panel 4 further includes a first passivation layer 42A disposed between the plurality of dimming electrodes 43 and the plurality of signal lines 41A. The first passivation layer 42A has a plurality of first vias H1, and each signal line 41A is electrically connected to a corresponding dimming electrode 43 through at least one first via H1.

For example, each signal line 41A is electrically connected to a corresponding dimming electrode 43 through a first via H1.

For example, each signal line 41A is electrically connected to a corresponding dimming electrode 43 through at least two first vias H1, such as two, three or four first vias H1, so that a resistivity of an electrical connection between the dimming electrode 43 and the signal line 41A may be reduced.

For example, a material of the first passivation layer 42A includes silicon nitride ($SiN_x$).

In some embodiments, as shown in FIG. 6B, in a case where the signal line 41A includes the plurality of portions 410 connected in sequence, and is in a shape of a broken line, an orthographic projection of the first via H1 on the display panel 3 is located at an intersection of orthographic projections of two adjacent portions 410 on the display panel 3. That is, the first via H1 is located at a corner of the bending unit 411. Compared with a position (e.g., a middle position of the portion 410) of the portion 410 except two ends at which the first via H1 is disposed, the first via H1 is disposed at an intersection of two adjacent portions 410, so that the resistivity of the electrical connection between the dimming electrode 43 and the signal line 41A may be reduced.

In some embodiments, as shown in FIGS. 6A and 6B, the dimming panel 4 further includes a driving chip 48 disposed on a side of the dimming electrodes 43, and the driving chip 48 is electrically connected to the plurality of signal lines 41A.

The driving chip 48 is configured to supply a control voltage signal to each signal line 41A to control voltages of the dimming electrodes 43 electrically connected to the signal lines 41A, so as to individually control the dimming electrode 43.

In the related art, as shown in FIG. 1, when displaying a screen, the display module 100 has a problem of shiny edges of the dimming electrodes, which affects the display quality. This problem is more obvious especially when a low gray scale screen is displayed.

It is found through research that one of the reasons for the above problem is that, due to the gaps (or spaces) between the plurality of dimming electrodes, liquid crystals in regions respectively directly facing the gaps cannot be effectively controlled, which results in light leakage from the gaps.

In order to solve the above problem, in some embodiments, for the gaps S between the plurality of dimming electrodes 43, light leakage simulation experiments were carried out at different widths of the gap, and experimental results are as shown in Table 2 below.

TABLE 2

| Width of gap (μm) | Influence width (μm) | Maximum brightness difference | |
|---|---|---|---|
| | | Brightness of gap Max | Block brightness |
| 2.8 | 7 | Approximately Gray 40 | Gray 9 |
| 3.0 | 8 | Gray 40 to 50 | |
| 3.5 | 9 | Approximately Gray 50 | |
| 4.0 | 10 | Approximately Gray 50 to 60 | |
| 4.5 | 10 | Approximately Gray 80 | |
| 5.0 | 12 | Approximately Gray 100 | |
| 6.5 | 12 | Gray104 to 150 | |
| 10 | 16 | Approximately Gray 200 | |

The "influence width" refers to a width of a light leakage region influenced by the gap S. It will be noted that, influenced by the deflection of the liquid crystal molecules, the light leakage region caused by the gap S between two adjacent dimming electrodes 43 includes not only a gap region, but also regions respectively located on two sides of the gap S in a direction perpendicular to an extending direction of the gap S and parallel to the dimming panel 4. Therefore, in the direction perpendicular to the extending direction of the gap S and parallel to the dimming panel 4, the width of the light leakage region is greater than the width of the gap.

The "brightness of gap Max" refers to a maximum brightness value of the light leakage region.

The "block brightness" refers to an average brightness value of the dimming region D where the dimming electrode 43 is located.

It can be obtained from Table 2 that in a case of the same block brightness, which may be considered that in a case of the same control voltage of the dimming electrodes 43, the smaller the width of the gap S, the smaller the influence width, and the smaller the brightness of gap Max. That is, the smaller the width of the gap S between two adjacent dimming electrodes 43, the smaller the width of the light leakage region influenced by the gap 5, and the smaller the maximum brightness value of the light leakage region, so that the visual effect of the light leakage is slighter.

Therefore, in combination with the above experimental results, the width of the gap S between two adjacent dimming electrodes 43 may be set as small as possible to reduce the light leakage from the gap S. For example, the width of the gap S may be set to a minimum value that a device may achieve. For example, the width of the gap S may be set to 2.8 μm.

Considering that if the width of the gap S is set too small, the manufacturing difficulty may be increased, and there may be too much etching residue, adjacent dimming electrodes 43 cannot be effectively insulated from each other. Therefore, the width of the gap S between the plurality of dimming electrodes 43 may be set to be in a range of 3.0 μm to 3.5 μm, inclusive, such as 3.0 μm, 3.1 μm, 3.3 μm, 3.4 μm or 3.5 μm. Thus, on a premise of not significantly increasing the process difficulty and ensuring an effective insulation between adjacent dimming electrodes 43, the light leakage from the gap S is reduced.

In order to verify the experimental results of the light leakage simulation experiments, following experiments were carried out.

Figure 17A:
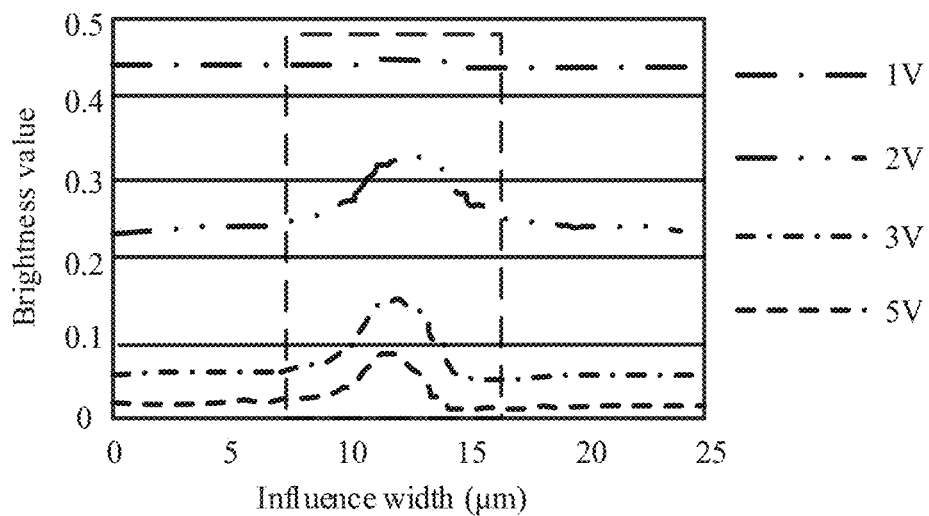
FIGS. 17A and 17B are distribution diagrams of brightness values at various positions in a gap region between dimming electrodes, in accordance with some embodiments of the present disclosure.
Figure 17B:
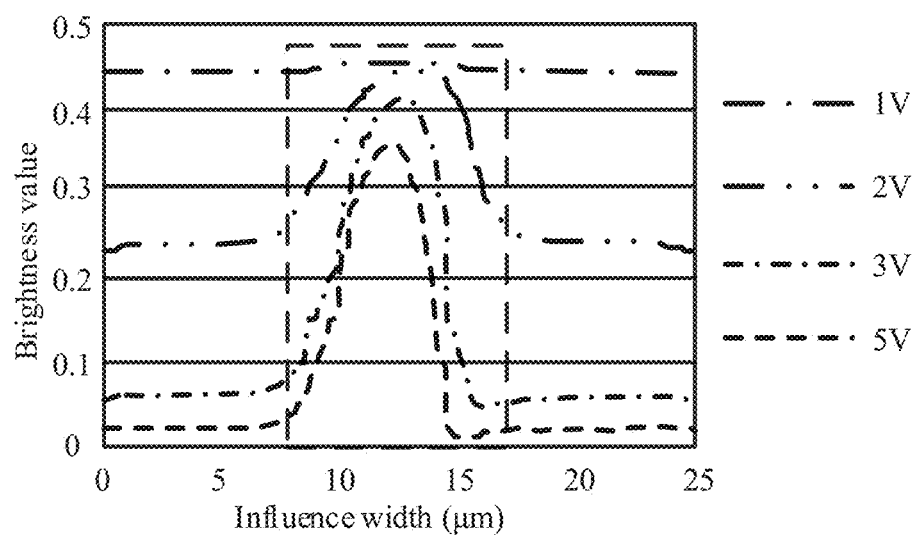

Referring to FIGS. 17A and 17B, FIG. 17A shows a distribution of brightness values at various positions in the gap in the direction perpendicular to the extending direction of the gap S and parallel to the dimming panel 4 in a case where the width of the gap S is 3.5 μm. FIG. 17B shows a distribution of brightness values at various positions in the gap S in the direction perpendicular to the extending direction of the gap S and parallel to the dimming panel 4 in a case where the width of the gap is 10 μm.

It can be seen that in a case of the same control voltage of the dimming electrodes 43, i.e., in a case of the same block brightness, the smaller the width of the gap 5, the smaller the brightness of gap Max, i.e., the smaller the maximum brightness value of the light leakage region, so that the visual effect of the light leakage is slighter.

In addition, the problem of light leakage from the gap S between the dimming electrodes 43 may also be solved by following embodiments.

In some embodiments, as shown in FIG. 6B, the dimming panel 4 further includes first light-shielding patterns 41B, and the first light-shielding patterns 41B and the signal lines 41A are made of a same material and arranged in a same layer. The first light-shielding pattern 41B extends as a whole in the second direction U.

It will be noted that the first light-shielding pattern 41B extends as a whole in the second direction U, which is similar to the above description of "each signal line 41A extends as a whole in the second direction U". That is, the first light-shielding pattern 41B has a tendency to extend as a whole in the second direction U.

An orthographic projection of the first light-shielding pattern 41B on the display panel 3 is located between orthographic projections of two adjacent columns of dimming electrodes 43 on the display panel 3. A gap between two adjacent columns of dimming electrodes 43 is shielded by using the first light-shielding pattern 41B, so that the light leakage from the gaps between the dimming electrodes is reduced, so as to alleviate the shining of the edges of the dimming electrode 43.

For example, as shown in FIG. 6B, in a case where the signal line 41A is in the shape of the broken line, an edge contour of the dimming electrode 43 extending in the second direction U is in a shape of a broken line that is the same as the shape of the signal line 41A, and the edge contour is parallel to the signal line 41A. Moreover, in the first direction V, edge contours, proximate to each other, of two adjacent dimming electrodes 43 have complementary shapes. On this basis, the first light-shielding pattern 41B is in a shape of a broken line that is the same as the shape of the edge contour of the dimming electrode 43 extending in the second direction U, and the first light-shielding pattern 41B is parallel to the edge contour.

With the above arrangements, the edge contour of the dimming electrode 43 extending in the second direction U and the first light-shielding pattern 41B have the same shape as the signal line 41A, i.e., all of them are in the shape of the broken line, so that the orthographic projection of the first light-shielding pattern 41B on the display panel 3 is located between the orthographic projections of the two adjacent columns of dimming electrodes 43 on the display panel 3, which is able to shield the gap between two adjacent dimming electrodes 43.

Moreover, compared with a design in which the signal line 41A is in the shape of the broken line, and the first light-shielding pattern 41B is in a shape of straight line, in the above embodiments, the first light-shielding pattern 41B and the signal line 41A have the same shape, so that a uniformity of the display effect may be ensured.

In addition, the first light-shielding patterns 41B and the signal lines 41A are made of the same material, and are arranged in the same layer, so that the first light-shielding patterns 41B and the signal lines 41A may be formed by a same process without additional process steps for forming the first light-shielding patterns 41B, which is conducive to simplifying the manufacturing process of the display module.

It will be noted that in the embodiments of the present disclosure, the dimming electrode 43 may have a rectangular shape, such as a square shape. The dimming electrode 43 may have other shapes, which is not limited in the embodiments of the present disclosure. In a case where the overall shape of the dimming electrode 43 is determined, the edge contour of the dimming electrode 43 may be straight or non-straight. For example, as shown in FIG. 6B, although the edge contour of the dimming electrode 43 extending in the second direction U is in the shape of the broken line, the overall shape of the dimming electrode 43 may still be considered to be substantially rectangular, e.g., substantially square.

In some embodiments, as shown in FIG. 6B, the dimming panel 4 further includes second light-shielding patterns 41C, and the second light-shielding patterns 41C and the signal lines 41A are made of a same material and arranged in a same layer. The second light-shielding pattern 41C extends as a whole in the first direction V, and the second light-shielding pattern 41C is disconnected at a position where the second light-shielding pattern 41C and the signal line 41A intersect.

Based on this, an orthographic projection of the second light-shielding pattern 41C on the display panel 3 is located between orthographic projections of two adjacent rows of dimming electrodes 43 on the display panel 3. A gap between two adjacent rows of dimming electrodes 43 is shielded by using the second light-shielding pattern 41C, so that the light leakage from the gaps between the dimming electrodes is further reduced, so as to alleviate the shining of the edges of the dimming electrode 43.

Moreover, the second light-shielding patterns 41C and the signal lines 41A are made of the same material, and are arranged in the same layer, so that the second light-shielding patterns 41C and the signal lines 41A may be formed by a same process without additional process steps for forming the second light-shielding patterns 41C, which is conducive to simplifying the manufacturing process of the display module.

In addition, the second light-shielding pattern 41C extends as a whole in the first direction V, and the second light-shielding pattern 41C is disconnected at the position where the second light-shielding pattern 41C and the signal line 41A intersect, so that crosstalk of the control voltage signals transmitted by the signal lines 41A due to an electrical connection between the second light-shielding pattern 41C and the signal line 41A may be avoided.

In the related art, in a process of attaching the dimming panel 2 to the display panel 1 and assembling the dimming panel 2 with the display panel 1, a black matrix pattern in the display panel 1 corresponds to a gap between two adjacent dimming electrodes as much as possible, so that the gap between two adjacent dimming electrodes is shielded by using the black matrix pattern block, thereby reducing light leakage from the gap.

However, since each dimming electrode in the dimming panel 2 corresponds to a plurality of sub-pixels in the display panel 1, a size of the dimming electrode is large relative to a size of a sub-pixel, and a width of the gap between two adjacent dimming electrodes is also large. In addition, an alignment between the dimming panel 2 and the display panel 1 is performed between two panels, so that an alignment accuracy is not high. Therefore, the black matrix pattern cannot effectively shield the gap between two adjacent dimming electrodes, which results in shiny edges of the dimming electrodes, so that the image quality of the display module 100 is affected. The shining of the edges of the dimming electrodes is more obvious especially when a low gray scale screen is displayed.

In order to solve the above problem, in some embodiments, as shown in FIG. 3, the display panel 3 includes a first substrate 30 and a second substrate 31 arranged opposite to each other, a driving circuit layer T disposed on a side of the first substrate 30 facing the second substrate 31, and a color filter layer 32 and a black matrix pattern 33 that are disposed on a side of the second substrate 31 facing the first substrate 30.

The driving circuit layer T is disposed on the first substrate 30, so that an array substrate 3A may be formed. The color filter layer 32 and the black matrix pattern 33 are disposed on the second substrate 31, so that a color filter substrate 3B may be formed. The display panel 3 may be formed by assembling the array substrate 3A with the color filter substrate 3B.

As shown in FIGS. 2 and 3, an orthographic projection of the black matrix pattern 33 on the second substrate 31 covers an orthogonal projection of the gap S between any two adjacent dimming electrodes 43 on the second substrate 31.

Through the above arrangements, the orthographic projection of the black matrix pattern 33 on the second substrate 31 covers the orthogonal projection of the gap S between any two adjacent dimming electrodes 43 on the second substrate 31, so that the black matrix pattern 33 shields the gap S between any two adjacent dimming electrodes 43 to prevent light from directly passing through the gap S toward the display panel 1, and the shining of the edges of the dimming electrodes is further alleviated.

The display panel 3 may be a liquid crystal display panel. In this case, in addition to the array substrate 3A and the color filter substrate 3B, the display panel 3 further includes a first liquid crystal layer 34 located between the array substrate 3A and the color filter substrate 3B, By applying an electric field to the first liquid crystal layer 34 and controlling liquid crystal molecules in the first liquid crystal layer 34 located in each sub-pixel region P to deflect to a different degree, the gray scale of each sub-pixel may be controlled.

As shown in FIGS. 2 and 3, the color filter layer 32 includes a plurality of filter portions respectively directly facing the plurality of sub-pixel regions P in one-to-one correspondence. The plurality of filter portions include, for example, a plurality of red filter portions, a plurality of green filter portions and a plurality of blue filter portions. The black matrix pattern 33 spaces the plurality of filter portions apart to prevent cross color between sub-pixels of different colors.

As shown in FIGS. 2 and 3, the dimming panel 4 includes a third substrate 40 located on a side of the second substrate 31 away from the first substrate 30 and arranged opposite to the second substrate 31. The dimming panel 4 and the display panel 3 share the second substrate 31. By assembling the third substrate 40 with the display panel 3, the dimming panel 4 may be formed.

It will be noted that, the dimming panel 4 and the display panel 3 share the second substrate 31, which means that the second substrate 31 serves as a substrate of the display panel 3 and as a substrate of the dimming panel 4.

As shown in FIG. 3, the dimming panel 4 further includes a second liquid crystal layer 45 disposed between the second substrate 31 and the third substrate 40. By applying an electric field to the second liquid crystal layer 45 and controlling liquid crystal molecules in the second liquid crystal layer 45 located in a different dimming region D to deflect to a different degree, a light transmittance of the second liquid crystal layer 45 may be zonally modulated.

Compared with a conventional display panel in which a color filter substrate is closer to a display side (i.e., light exit side) of the display panel than an array substrate, in the above embodiments of the present disclosure, referring to FIGS. 2 and 3, the array substrate 3A of the display panel 3 is close to a display side E (i.e., light exit side) of the display module 200, and the color filter substrate 3B is disposed on a side of the array substrate 3A proximate to the dimming panel 4, so that a distance, in the direction C perpendicular to the display panel 3, between the black matrix pattern 33 in the color filter substrate 3B and the dimming electrode in the dimming pan& 4 is reduced, so as to reduce an alignment difficulty of the black matrix pattern 33 and the gap S between two adjacent dimming electrodes, which is conducive to improving the alignment accuracy of the black matrix pattern 33 and the gap S between two adjacent dimming electrodes. Thus, the black matrix pattern 33 may effectively shield light leaking from the gap region between two adjacent dimming electrodes, so that the shiny edges of the dimming electrodes are avoided, and the image quality of the display module 200 is improved.

Moreover, in the conventional technology, two panels, i.e., the dimming panel 4 and the display panel 3, need to be aligned. However, in the above embodiments of the disclosure, the dimming panel 4 and the display panel 3 share the second substrate 31, so that in a process of forming the dimming panel 4, the third substrate 40 of the dimming panel 4 and the display panel 3 are aligned. An alignment accuracy of a substrate and a panel is higher than an alignment accuracy of two panels, That is, an alignment accuracy of the third substrate 40 of the dimming panel 4 and the display panel 3 is higher, which is conducive to more effectively shielding the light leakage from the gap region between two adjacent dimming electrodes by the black matrix pattern 33.

In addition, since the dimming panel 4 and the display panel 3 share the second substrate 31, a substrate is removed from the display module 200, so that the thickness of the display module 200 is reduced, which is conducive to the lightness and thinness of the display module 200.

In some embodiments, in a case where the alignment accuracy of the dimming panel 4 and the display panel 3 is improved, and the black matrix pattern 33 may be ensured to shield the gap S between any two adjacent dimming electrodes 43, a width of a portion of the black matrix pattern 33 that is opposite to the gap S may be moderately reduced, which is conducive to increasing an aperture ratio of the sub-pixel region P, thereby being conducive to increasing the display brightness of the display module 200.

For example, the width of the portion of the black matrix pattern 33 that is opposite to the gap S may be set to be in a range of 4.0 µm to 6.0 µm, inclusive, such as 5 µm, 5.2 µm, 5.4 µm, 5.6 µm, 5.8 µm or 6.0 µm.

In some embodiments, as shown in FIGS. 3 and 7, the display panel 3 further includes first alignment films 35 respectively disposed on two sides of the first liquid crystal layer 34. That is, a surface of the array substrate 3A facing the color filter substrate 38 and a surface of the color filter substrate 38 facing the array substrate 3A are each provided with a first alignment film 35.

In some embodiments, as shown in FIGS. 3 and 7, the plurality of dimming electrodes 43 are disposed on one of the second substrate 31 or the third substrate 40.

For example, as shown in FIG. 3, in a case where the plurality of dimming electrodes 43 are disposed on the third substrate 40, the plurality of signal lines 41A are disposed on the third substrate 40.

In a case where the plurality of signal lines 41A are disposed on the third substrate 40, the plurality of signal lines 41A are located on a side of the plurality of dimming electrodes 43 proximate to the third substrate 40, which is shown in FIG. 3; or the plurality of signal lines 41A are located on a side of the plurality of dimming electrodes 43 away from the third substrate 40.

For example, as shown in FIG. 7, in a case where the plurality of dimming electrodes 43 are disposed on the second substrate 31, the plurality of signal lines 41A are disposed on the second substrate 31.

In a case where the plurality of signal lines 41A are disposed on the second substrate 31, the plurality of signal lines 41A are located on a side of the plurality of dimming electrodes 43 proximate to the second substrate 31, which is shown in FIG. 7; or the plurality of signal lines 41A are located on a side of the plurality of dimming electrodes 43 away from the second substrate 31.

In some embodiments, as shown in FIGS. 3 and 7, the dimming panel 4 further includes a reference electrode 46 disposed on one of the second substrate 31 and the third substrate 40. An orthographic projection of the reference electrode 46 on the second substrate 31 is overlapped with an orthographic projection of each dimming electrode 43 on the second substrate 31.

When the dimming panel 4 is in operation, the reference electrode 46 is configured to transmit a reference voltage signal, and each dimming electrode 43 transmits the control voltage signal, so that an electric field is generated between each dimming electrode 43 and the reference electrode 46. The electric field may drive liquid crystal molecules in the second liquid crystal layer 45 located in a corresponding dimming region D to deflect, so that the light transmittance of each dimming region D through which the light passes toward the display panel 3 is adjusted.

For example, the reference electrode 46 may cover the entire display area of the display panel 3. In some embodiments, as shown in FIGS. 3 and 7, the reference electrode 46 is disposed on a different substrate from the plurality of dimming electrodes 43. A liquid crystal modulation type of the dimming panel 4 may be a twisted nematic (TN) type.

For example, as shown in FIGS. 3 and 7, the dimming electrodes 43 are block electrodes, and are arranged independently of each other. The reference electrode 46 is a planar electrode covering the entire display area of the display panel 3.

For example, as shown in FIG. 3, the plurality of dimming electrodes 43 are disposed on a side of the third substrate 40 proximate to the first substrate 30, and the reference electrode 46 is disposed on the side of the second substrate 31 away from the first substrate 30.

In the above embodiments, since the dimming electrodes 43 are block electrodes, and the dimming electrodes 43 need to be manufactured by photolithography, the dimming electrodes 43 are disposed on the third substrate 40 with a simple structure (the third substrate 40 has a simpler structure with respect to the display panel 3), so that the difficulty of the manufacturing process of the dimming electrodes 43 may be reduced, and an influence that the manufacturing of the dimming electrodes 43 may have on the structures in the display panel 3 is avoided.

For example, as shown in FIG. 7, the plurality of dimming electrodes 43 are disposed on the side of the second substrate 31 away from the first substrate 30, and the reference electrode 46 is disposed on the side of the third substrate 40 proximate to the first substrate 30. The black matrix pattern 33 and the dimming electrode 43 are disposed on the second substrate 31, and are respectively located on two sides of the second substrate 31, so that the distance, in the direction C perpendicular to the display panel 3, between the black matrix pattern 33 and the dimming electrode 43 may be further reduced, and the alignment difficulty of the black matrix pattern 33 and the gap S between two adjacent dimming electrodes is further reduced.

Moreover, if the black matrix pattern 33 and the dimming electrode 43 are respectively manufactured on two substrates, the substrates on which the two are located need to be aligned subsequently, so that an alignment deviation exists inevitably. However, in the above embodiments, the black matrix pattern 33 and the dimming electrode 43 are disposed on the second substrate 31, and are respectively located on the two sides of the second substrate 31, so that when the black matrix pattern 33 is aligned with the gap 5, an accurate alignment of the black matrix pattern 33 and the gap S may be realized only by setting alignment marks on corresponding film layers. Thus, the alignment deviation caused by the alignment of the two substrates is eliminated, so that the black matrix pattern 33 is able to more effectively shield the gap S between two adjacent dimming electrodes 43.

Figure 8:
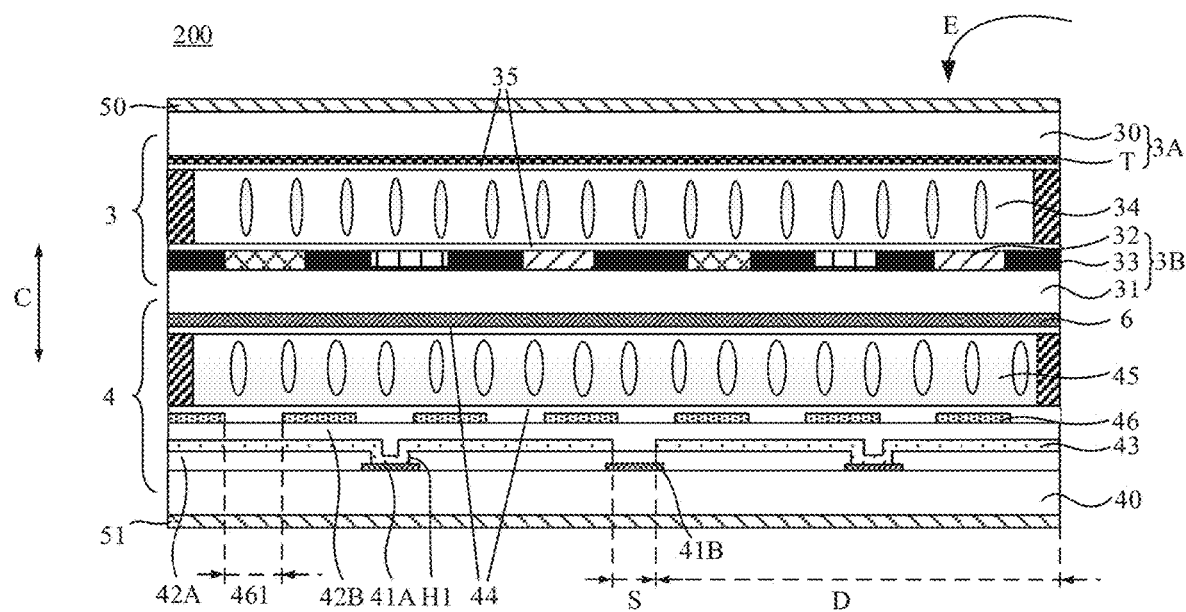
FIG. 8 is a partial sectional view of another display module, in accordance with some embodiments of the present disclosure.
Figure 9:
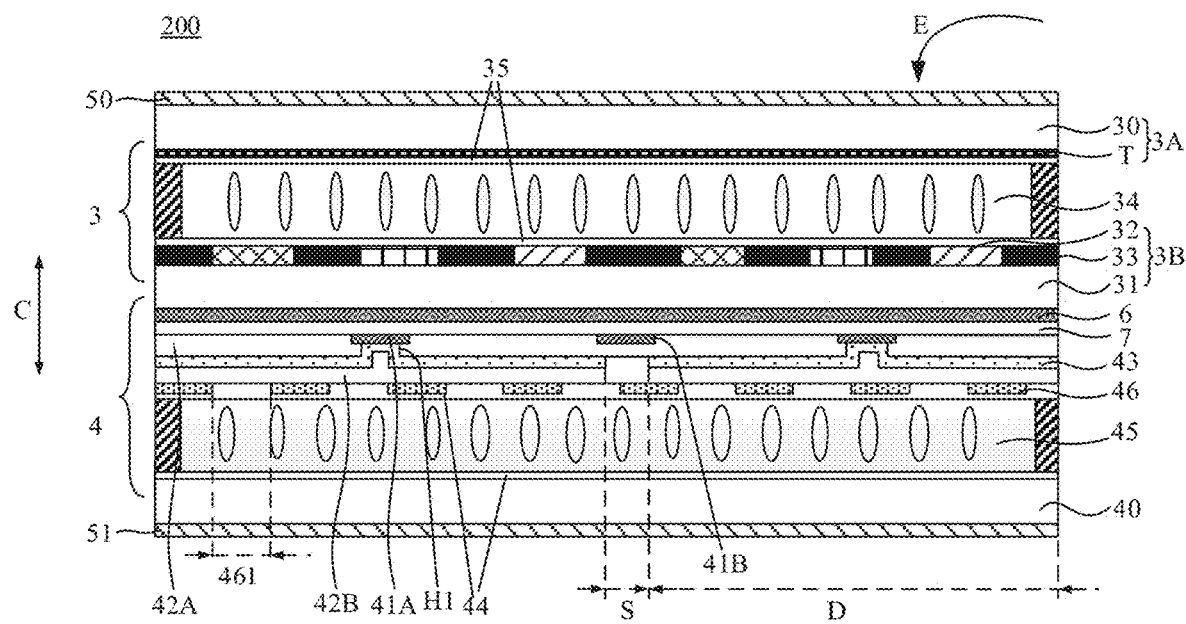
FIG. 9 is a partial sectional view of yet another display module, in accordance with some embodiments of the present disclosure.

In some other embodiments, as shown in FIGS. 8 and 9, the reference electrode 46 and the plurality of dimming electrodes 43 are disposed on the same substrate. The liquid crystal modulation type of the dimming panel 4 may be an advanced super dimension switch (ADS) type.

The reference electrode 46 is farther from the substrate where the reference electrode 46 and the plurality of dimming electrodes 43 are located than the plurality of dimming electrodes 43. The dimming electrodes 43 are block electrodes, and are arranged independently of each other. The reference electrode 46 is a planar electrode covering the entire display area of the display panel 3, and each dimming electrode 43 directly faces a portion, having a plurality of slits 461, of the reference electrode 46.

For example, as shown in FIG. 8, the reference electrode 46 and the plurality of dimming electrodes 43 are all disposed on the side of the third substrate 40 proximate to the first substrate 30. The reference electrode 46 and the plurality of dimming electrodes 43 are disposed on the third substrate 40 with a simple structure, so that the difficulty of the manufacturing process of the reference electrode 46 and the dimming electrodes 43 may be reduced, and an influence that the manufacturing of the reference electrode 46 and the dimming electrodes 43 may have on the structures in the display panel 3 is avoided.

For example, as shown in FIG. 9, the reference electrode 46 and the plurality of dimming electrodes 43 are all disposed on the side of the second substrate 31 away from the first substrate 30. The reference electrode 46 and the plurality of dimming electrodes 43 are all disposed on the second substrate 31, so that the alignment difficulty of the black matrix pattern 33 and the gap S between two adjacent dimming electrodes may be reduced.

Figure 10:
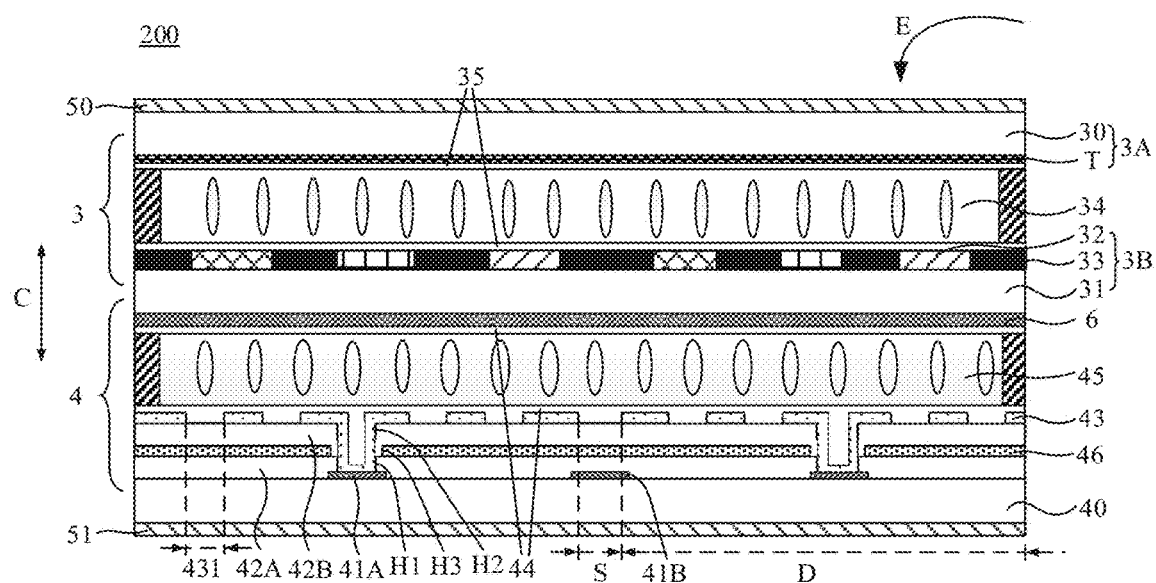
FIG. 10 is a partial sectional view of yet another display module, in accordance with some embodiments of the present disclosure.
Figure 11:
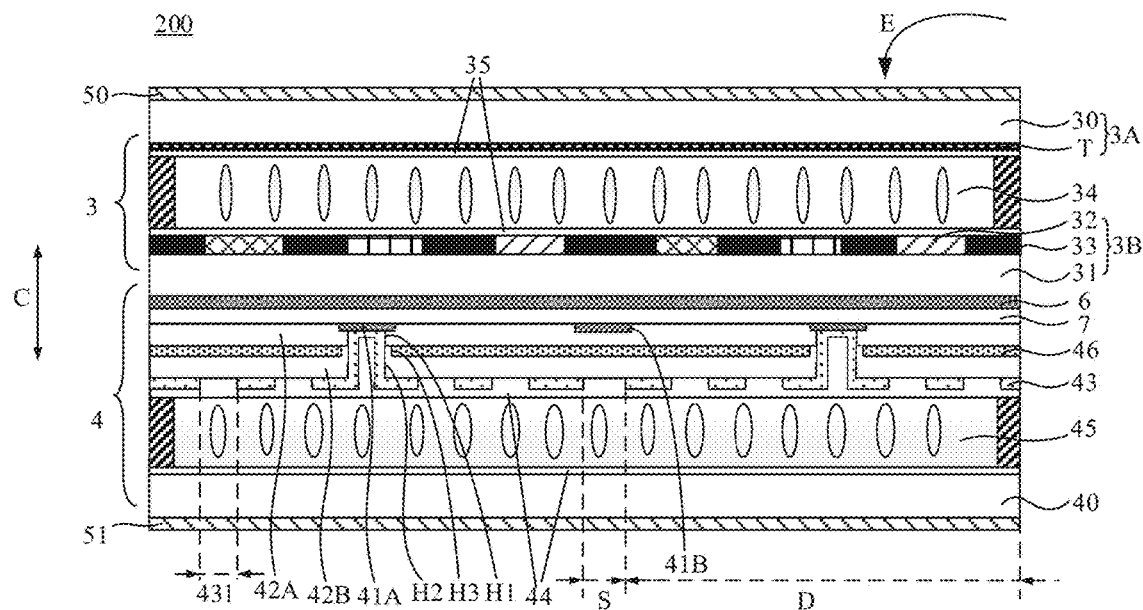
FIG. 11 is a partial sectional view of yet another display module, in accordance with some embodiments of the present disclosure.

In some other embodiments, as shown in FIGS. 10 and 11, the reference electrode 46 and the plurality of dimming electrodes 43 are disposed on the same substrate, and the reference electrode 46 is closer to the substrate where the reference electrode 46 and the plurality of dimming electrodes 43 are located than the plurality of dimming electrodes 43.

For example, the reference electrode 46 is a planar electrode covering the entire display area of the display panel 3. The dimming electrodes 43 are block electrodes, and are arranged independently of each other. Each dimming electrode 43 has a plurality of slits 431.

A plurality of third vias H3 are provided in the reference electrode 46, so that the plurality of dimming electrodes 43 may be respectively electrically connected to the signal lines 41A on the substrate through respective third vias H3, so as to transmit the control voltage signal to the plurality of dimming electrodes 43.

For example, as shown in FIG. 10, the reference electrode 46 and the plurality of dimming electrodes 43 are all disposed on the side of the third substrate 40 proximate to the first substrate 30.

For example, as shown in FIG. 11, the reference electrode 46 and the plurality of dimming electrodes 43 are all disposed on the side of the second substrate 31 away from the first substrate 30.

In some embodiments, as shown in FIGS. 8 to 11, in a case where the reference electrode 46 and the plurality of dimming electrodes 43 are disposed on the same substrate, the dimming panel 4 further includes a second passivation layer 42B disposed between the plurality of dimming electrodes and the reference electrode 46, so as to insulate the plurality of dimming electrodes 43 from the reference electrode 46.

For example, as shown in FIGS. 8 and 9, in a case where the reference electrode 46 is farther from the substrate where the reference electrode 46 and the plurality of dimming electrodes 43 are located than the plurality of dimming electrodes 43, the second passivation layer 42B covers the plurality of dimming electrodes 43 to separate the plurality of dimming electrodes 43 from the reference electrode 46, so that the dimming electrodes 43 are insulated from the reference electrode 46.

For example, as shown in FIGS. 10 and 11, in a case where the reference electrode 46 is closer to the substrate where the reference electrode 46 and the plurality of dimming electrodes 43 are located than the plurality of dimming electrodes 43, and the reference electrode 46 is located between a film layer where the plurality of signal lines 41A are located and the plurality of dimming electrodes 43, portions of the second passivation layer 42B are embedded into respective third vias H3 in the reference electrode 46, and are in contact with the first passivation layer 42A. The second passivation layer 42B is provided with second vias H2 penetrating the second passivation layer 42B, and a second via H2 is communicated with a first via H1 to expose at least a portion of the signal line 41A. Each dimming electrode 43 is electrically connected to a signal line 41A through the second via H2 and the first via H1.

A portion of the second passivation layer 42B embedded into a third via H3 in the reference electrode 46 separates each dimming electrode 43 from an inner wall of the third via H3 in the reference electrode 46, so that the dimming electrode 43 is insulated from the reference electrode 46.

In some embodiments, as shown in FIGS. 3 and 7, the dimming panel 4 further includes second alignment films 44 respectively disposed on two sides of the second liquid crystal layer 45. That is, a surface of the color filter substrate 3B facing the third substrate 40 and a surface of the third substrate 40 facing the color filter substrate 38 are each provided with a second alignment film 44.

In some embodiments, as shown in FIGS. 3 and 7, the display module 200 further includes a first polarizer 50 disposed on a side of the first substrate 30 away from the second substrate 31, a metal wire grid polarizing layer (i.e., wire grid polarizer, WGP) 6 disposed on the side of the second substrate 31 away from the first substrate 30, and a second polarizer 51 disposed on a side of the third substrate 40 away from the first substrate 30.

A direction D1 of an absorption axis of the first polarizer 50 and a direction D2 of an absorption axis of the second polarizer 51 are perpendicular to a direction D3 of an absorption axis of the metal wire grid polarizing layer 6.

In a case where the display module 200 is a display module in a normally white mode, in an off state of the dimming panel 4, light from a backlight module whose polarization direction is perpendicular to the absorption axis of the second polarizer 51 enters the dimming panel 4 of the display module 200 through the second polarizer 51. Then, a polarization direction of the polarized light is deflected 90° by the second liquid crystal layer 45, and is perpendicular to the absorption axis of the metal wire grid polarizing layer 6, so that the polarized light may all enter the display panel 3 through the metal wire grid polarizing layer 6. Then, the polarization direction of the polarized light is deflected 90° by the first liquid crystal layer 34, and is perpendicular to the absorption axis of first polarizer 50, so that the polarized light may finally all pass through the first polarizer 50, and thus, the display module 200 is in the normally white mode.

It will be noted that relationships between the directions of the absorption axes of the first polarizer 50, the second polarizer 51 and the metal wire grid polarizing layer 6 are not limited to the above relationships, and may be set accordingly according to respective liquid crystal modulation modes of the display panel 3 and the dimming panel 4 and the normally white mode or a normally black mode of the display module 200.

For example, the metal wire grid polarizing layer 6 includes a plurality of metal wires that are parallel to each other. A material of the metal wires may include aluminum or silver or molybdenum.

In the above embodiments of the present disclosure, the metal wire grid polarizing layer 6 may be disposed on the of the second substrate 31 away from the first substrate 30 by photolithography instead of a polarizer adhered to the second substrate 31, so that a film layer, such as the dimming electrodes 43 or the reference electrode 46, may be further manufactured on the second substrate 31 in a subsequent step, and the purpose of sharing the second substrate 31 with the dimming panel 4 and the display panel 3 is achieved. Moreover, compared with the polarizer, the metal wire grid polarizing layer 6 is used, which is conducive to reducing the thickness of the display module 200.

In some embodiments, as shown in FIG. 3, in a case where the reference electrode 46 is disposed on the second substrate 31, and the plurality of dimming electrodes 43 are disposed on the third substrate 40, the metal wire grid polarizing layer 6 is located between the second substrate 31 and the reference electrode 46.

On this basis, the display module 200 further includes an insulating layer disposed between the metal wire grid polarizing layer 6 and the reference electrode 46. The metal wire grid polarizing layer 6 is separated from the reference electrode 46 by the insulating layer 7, so that the metal wire grid polarizing layer 6 is insulated from the reference electrode 46.

For example, a material of the insulating layer 7 includes silicon nitride.

In some other embodiments, as shown in FIG. 7, in a case where the plurality of dimming electrodes 43 are disposed on the second substrate 31, and the reference electrode 46 is disposed on the third substrate 40, the metal wire grid polarizing layer 6 is located between the second substrate 31 and the plurality of dimming electrodes 43.

On this basis, the display module 200 further includes an insulating layer 7 disposed between the metal wire grid polarizing layer 6 and the plurality of signal lines 41A. The metal wire grid polarizing layer 6 is separated from the plurality of signal lines 41A by the insulating layer 7, so that the metal wire grid polarizing layer 6 is insulated from the plurality of signal lines 41A.

In the above embodiments, a material of the insulating layer 7 includes silicon nitride.

In some other embodiments, as shown in FIGS. 8 and 10, in a case where the plurality of dimming electrodes 43 and the reference electrode 46 are all disposed on the third substrate 40, the metal wire grid polarizing layer 6 is located between the second substrate 31 and the second alignment film 44.

In some other embodiments, as shown in FIG. 9, in a case where the plurality of dimming electrodes 43 and the reference electrode 46 are all disposed on the second substrate 31, and the plurality of dimming electrodes 43 are closer to the second substrate 31 than the reference electrode 46, the metal wire grid polarizing layer 6 is located between the second substrate 31 and the plurality of dimming electrodes 43.

In some other embodiments, as shown in FIG. 11, in a case where the plurality of dimming electrodes 43 and the reference electrode 46 are all disposed on the second substrate 31, and the reference electrode 46 is closer to the second substrate 31 than the plurality of dimming electrodes 43, the metal wire grid polarizing layer 6 is located between the second substrate 31 and the reference electrode 46.

On this basis, as shown in FIGS. 9 and 11, the display module 200 further includes an insulating layer 7 disposed between the metal wire grid polarizing layer 6 and the plurality of signal lines 41A. The metal wire grid polarizing layer 6 is separated from the plurality of signal lines 41A by the insulating layer 7, so that the metal wire grid polarizing layer 6 is insulated from the plurality of signal lines 41A.

In some embodiments, the first substrate 30 and the second substrate 31 of the display panel 3 and the third substrate 40 of the dimming panel 4 are flexible and stretchable substrates, which is conducive to the chip on pi (COP) encapsulation process of the display module 200. Thus, a narrow bezel of the display module 200 may be realized to improve a screen-to-body ratio of the display module 200.

For example, materials of the first substrate 30, the second substrate 31 and the third substrate 40 each may include colorless polyimide (CPI).

Figure 12:
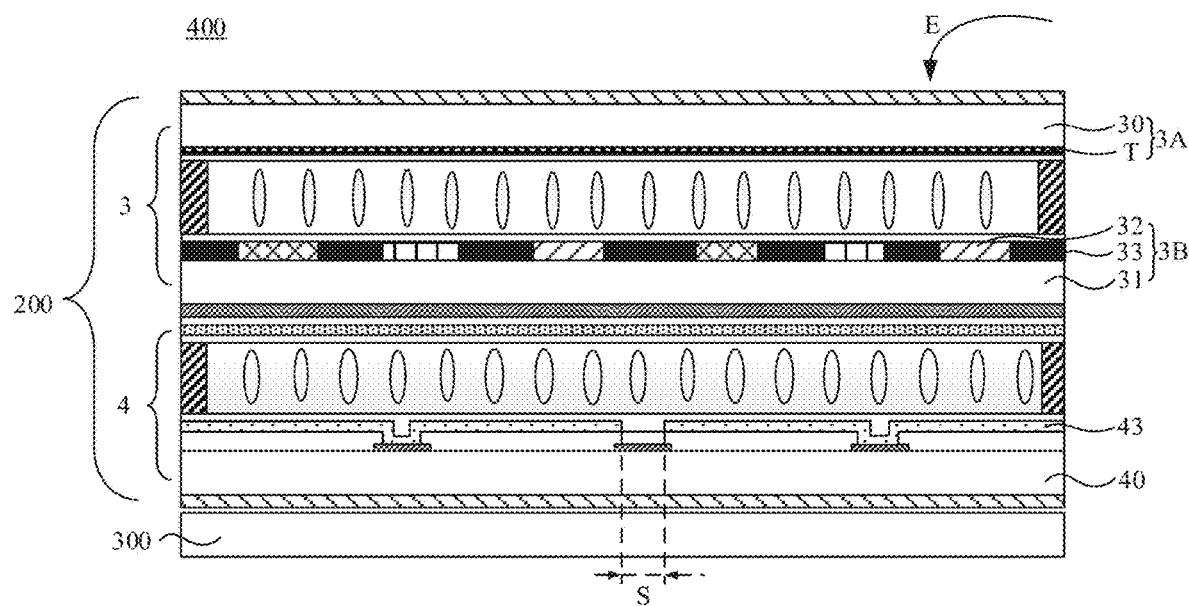
FIG. 12 is a structural diagram of a display device, in accordance with some embodiments of the present disclosure.

Some embodiments of the present disclosure further provide a display device. As shown in FIG. 12, the display device 400 includes the display module 200 in one of the above embodiments and a backlight module 300 disposed on a side of the dimming panel 4 away from the display panel 3, The backlight module 300 is used for providing light required by displaying image(s) for the display module 200.

In the display device 400 provided in the embodiments of the disclosure, the dimming panel 4 is passively driven. In this way, the dimming panel 4 does not need to be provided with a driving circuit, which avoids the reduction of the light transmittance of the dimming panel 4 due to the shielding of light by the driving circuit, so that the light transmittance of the dimming panel 4 is improved, and the image quality of the display device 400 is improved.

The display device 400 may be a high transmittance advanced super dimension switch (HACKS) liquid crystal display device, or may be an advanced super dimension switch liquid crystal display device, an in-plane switching (IPS) liquid crystal display device, a fringe field switching (PFS) liquid crystal display device, a twisted nematic (TN) liquid crystal display device, a multi-domain vertical alignment (MVA) liquid crystal display device, or a patterned vertical alignment (PVA) liquid crystal display device.

The display device 400 may be any device that displays images whether moving (e.g., videos) or stationary (e.g., still images), More specifically, it is anticipated that the embodiments may be implemented in, or associated with, a variety of electronic devices. The variety of electronic devices are, for example (but not limit to), mobile phones, wireless devices, personal data assistants (PDAs), hand-held or portable computers, global positioning system (GPS) receivers/navigators, cameras, MP4 video players, camcorders, game consoles, watches, clocks, calculators, television monitors, flat panel displays, computer monitors, auto displays (e.g., odometer displays), navigators, cockpit controllers and/or displays, camera view displays (e.g., rear-view camera displays in vehicles), electronic photos, electronic billboards or signs, projectors, architectural structures, packaging and aesthetic structures (e.g., displays for displaying an image of a piece of jewelry).

Figure 13A:
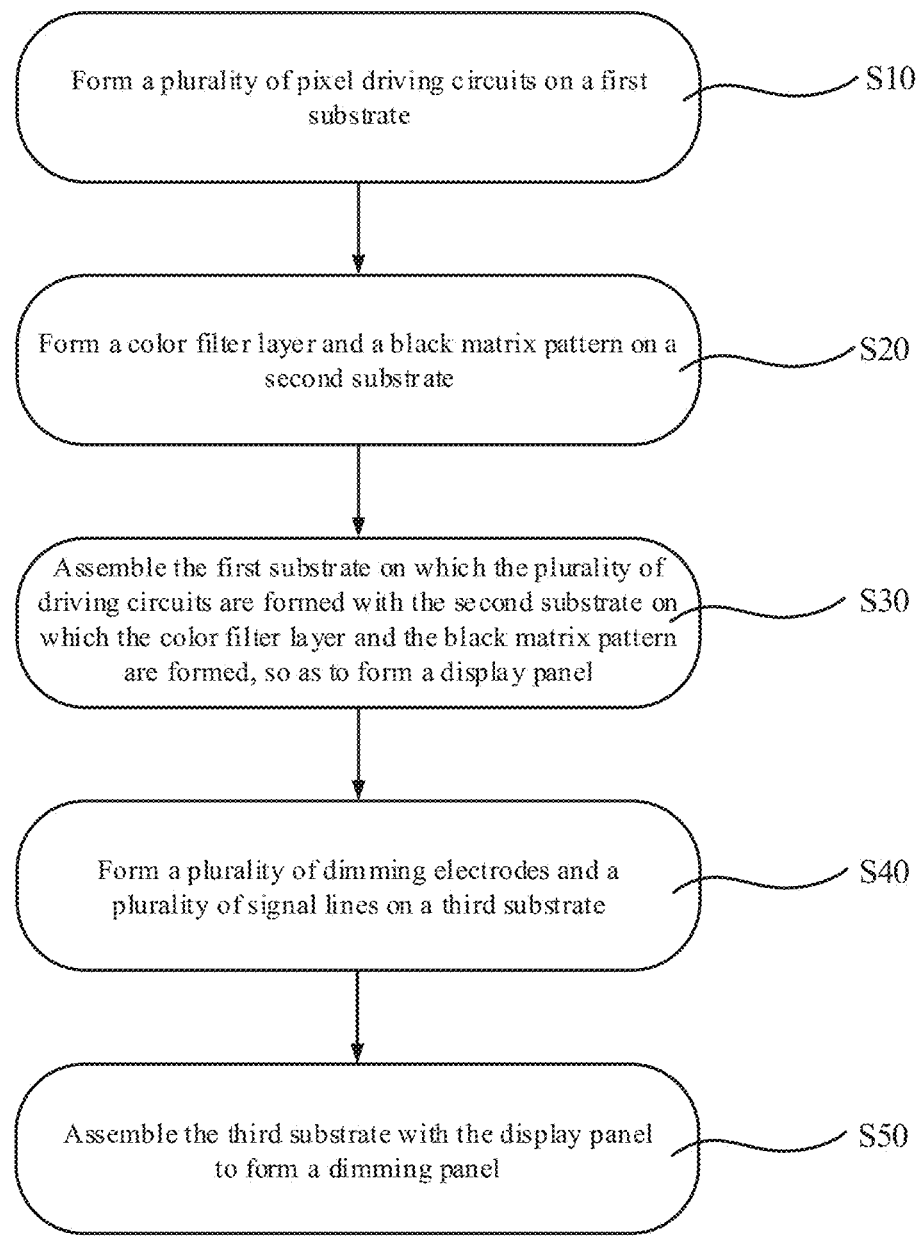
FIG. 13A is a basic flow diagram of a manufacturing method of a display module, in accordance with some embodiments of the present disclosure.

Some embodiments of the present disclosure further provide a manufacturing method of a display module 200. As shown in FIG. 13A, the manufacturing method includes S10 to S40.

In S10, a plurality of pixel driving circuits T' are formed on a first substrate 30.

Figure 14A:
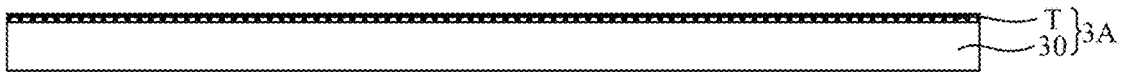
FIGS. 14A to 14K are diagrams showing steps of a manufacturing method of a display module, in accordance with some embodiments of the present disclosure.

For example, as shown in FIG. 14A, a driving circuit layer T is formed on the first substrate 30, and the driving circuit layer T includes the plurality of pixel driving circuits T', so as to obtain an array substrate 3A, A pixel driving circuit T' is located in a sub-pixel region P, and is used for controlling s gray scale of s sub-pixel.

In S20, a color filter layer 32 and a black matrix pattern 33 are formed on a second substrate 31.

Figure 14B:

For example, as shown in FIG. 14B, the color filter layer 32 and the black matrix pattern 33 are formed on the second substrate 31, so as to obtain a color filter substrate 3B. The color filter layer 32 includes red filter portions, green filter portions and blue filter portions. The black matrix pattern 33 spaces the red filter portions, the green filter portions and the blue filter portions apart to prevent cross color between sub-pixels of different colors.

For example, the black matrix pattern 33 may be formed first, and the black matrix pattern 33 has a plurality of vias. Then, the color filter layer 32 is formed in the vias of the black matrix pattern 33.

Figure 14C:
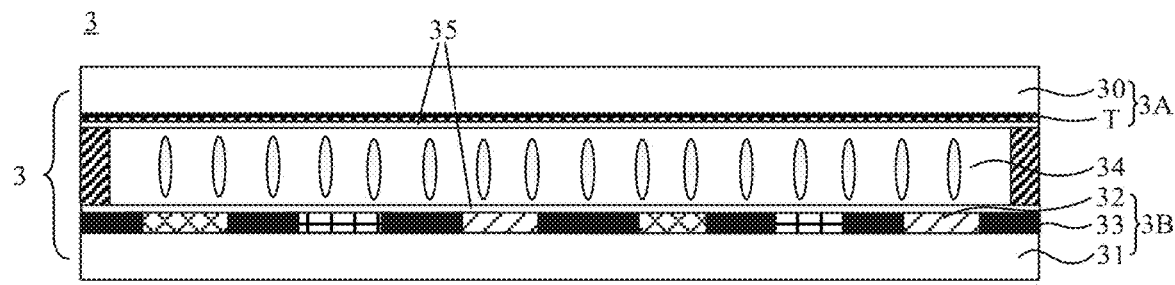

In S30, as shown in FIG. 14C, the first substrate 30 on which the plurality of pixel driving circuits T' are formed is assembled with the second substrate 31 on which the color filter layer 32 and the black matrix pattern 33 are formed, so as to form a display panel 3.

The display panel 3 has a plurality of sub-pixel regions P, and is configured to display image(s).

In the above step, liquid crystal molecules are injected into a liquid crystal cell formed by the first substrate 30 and the second substrate 31 during assembling to form a first liquid crystal layer 34 of the display panel 3.

Figure 13B:
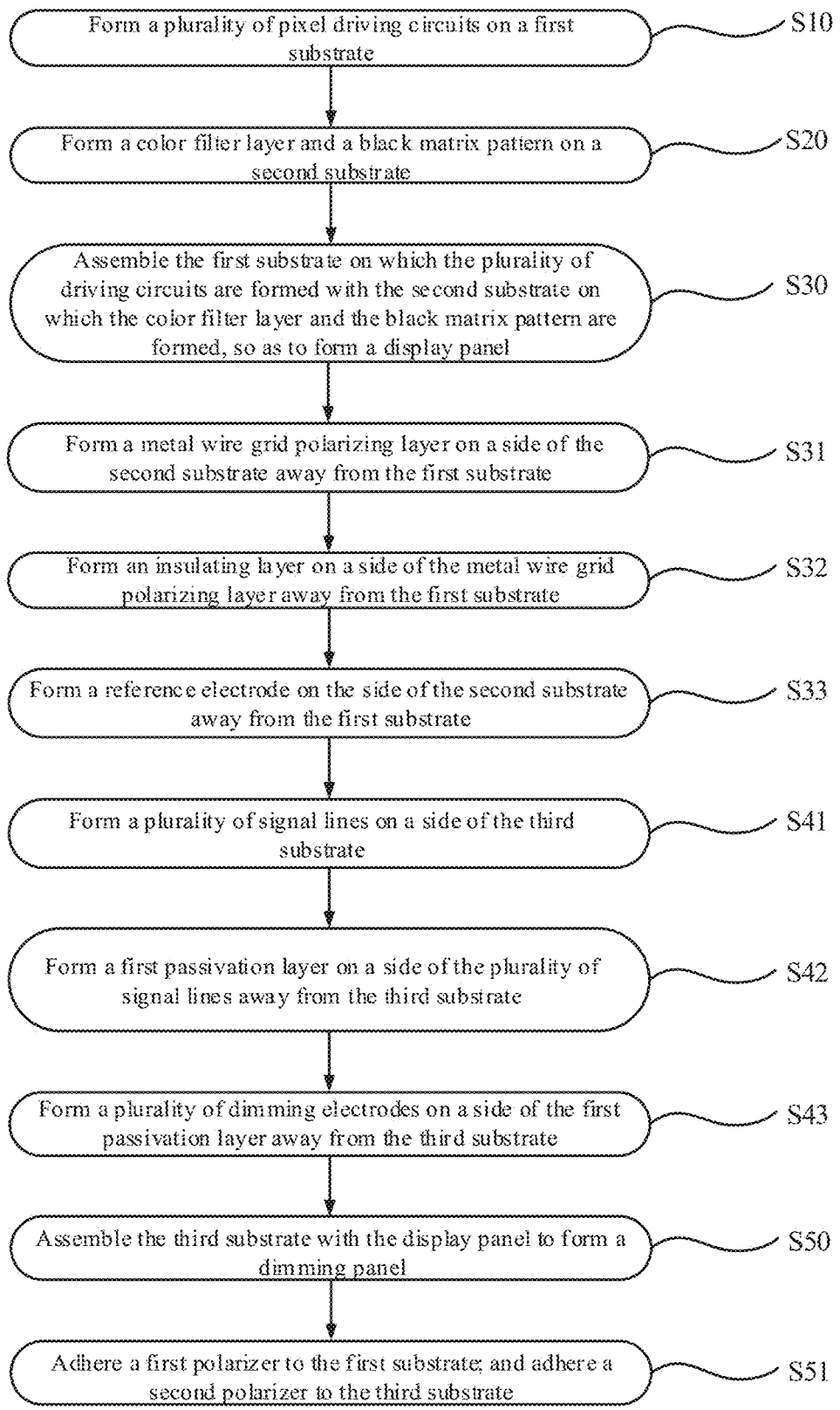
FIG. 13B is a specific flow diagram of a manufacturing method of a display module, in accordance with some embodiments of the present disclosure.

In some embodiments, as shown in FIG. 13B, after S30 and before S40, the manufacturing method of the display module 200 further includes following S31 to S33.

Figure 14D:
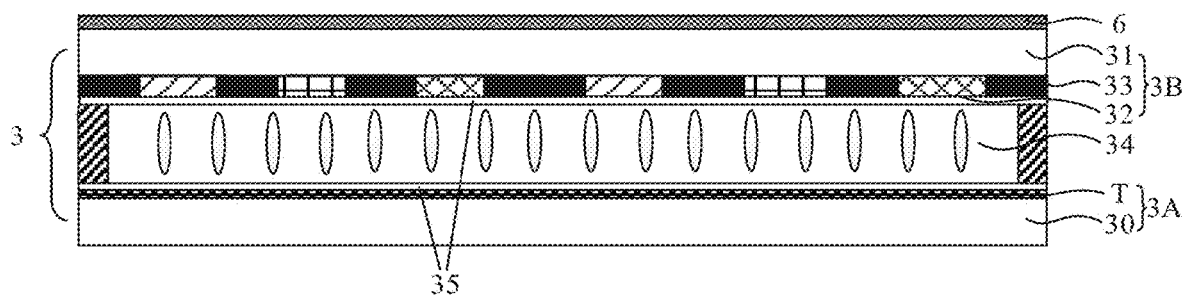

In S31, as shown in FIG. 14D, before S33, a metal wire grid polarizing layer 6 is formed on a side of the second substrate 31 away from the first substrate 30 by patterning.

For example, a metal wire grid polarizing film is formed on the side of the second substrate 31 away from the first substrate 30 by film deposition. The metal wire grid polarizing film is patterned by photolithography, so as to form the metal wire grid polarizing layer 6. For example, the film deposition may include chemical vapor deposition (CVD), plasma enhanced chemical vapor deposition (PECVD), or magnetron sputtering.

Figure 14E:
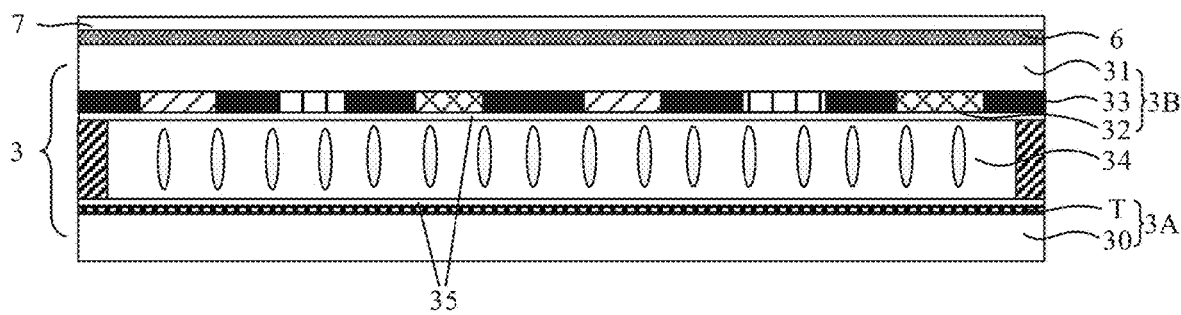

In S32, as shown in FIG. 14E, after S31, an insulating layer 7 is formed on a side of the metal wire grid polarizing layer 6 away from the first substrate 30 by film deposition.

The metal wire grid polarizing layer 6 is separated from a reference electrode 46 to be formed later by the insulating layer 7, so as to insulate the metal wire grid polarizing layer 6 from the reference electrode 46.

Figure 14F:
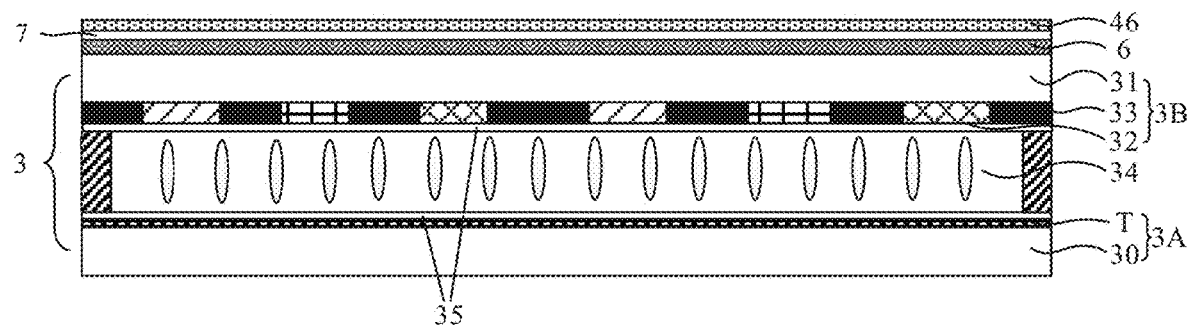

In S33, as shown in FIG. 14F, the reference electrode 46 is formed on the side of the second substrate 31 away from the first substrate 30.

For example, the reference electrode 46 is formed on a side of the insulating layer 7 away from the first substrate 30 by magnetron sputtering.

In S40, a plurality of dimming electrodes 43 and a plurality of signal lines 41A are formed on a third substrate 40.

For example, S40 may include following S41 to S43.

Figure 14G:
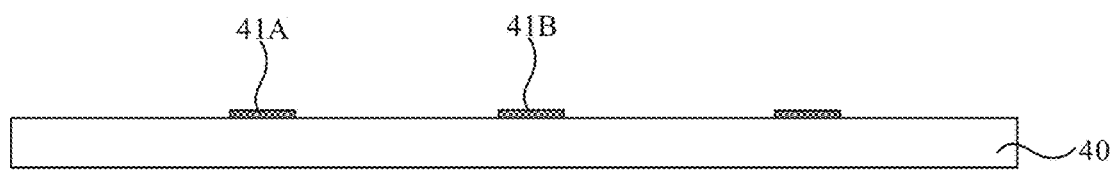

In S41, as shown in FIG. 14G, the plurality of signal lines 41A are formed on a side of the third substrate 40.

For example, a signal line metal layer is formed on the side of the third substrate 40 by using chemical vapor deposition. The signal line metal layer is patterned by photolithography to form the plurality of signal lines 41A.

Figure 14H:
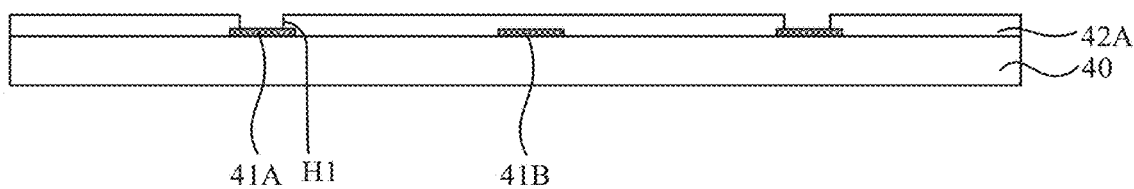

In S42, as shown in FIG. 14H, a first passivation layer 42A is formed on a side of the plurality of signal lines 41A away from the third substrate 40.

For example, the first passivation layer 42A covering the plurality of signal lines 41A is formed on the side of the plurality of signal lines 41A away from the third substrate 40 by using chemical vapor deposition. A plurality of first vias H1 are formed in the first passivation layer 42A by dry etching, and a first via H1 exposes at least a portion of a signal line 41A.

Figure 14I:
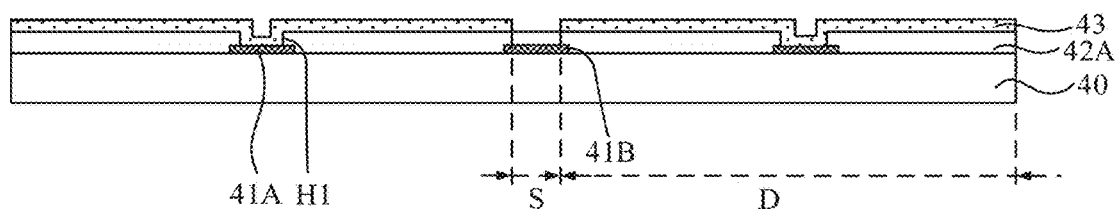

In S43, as shown in FIG. 14I, the plurality of dimming electrodes 43 are formed on a side of the first passivation layer 42A away from the third substrate 40.

Each signal line 41A is electrically connected to a corresponding dimming electrode 43 through a first via H1. A dimming electrode 43 is located in a dimming region D, and any two adjacent dimming electrodes 43 have a gap S therebetween.

For example, an electrode film is formed on a side of the first passivation layer 42A proximate to the first substrate 30 by magnetron sputtering. The electrode film is patterned by wet etching to form the plurality of dimming electrodes 43.

Figure 14J:
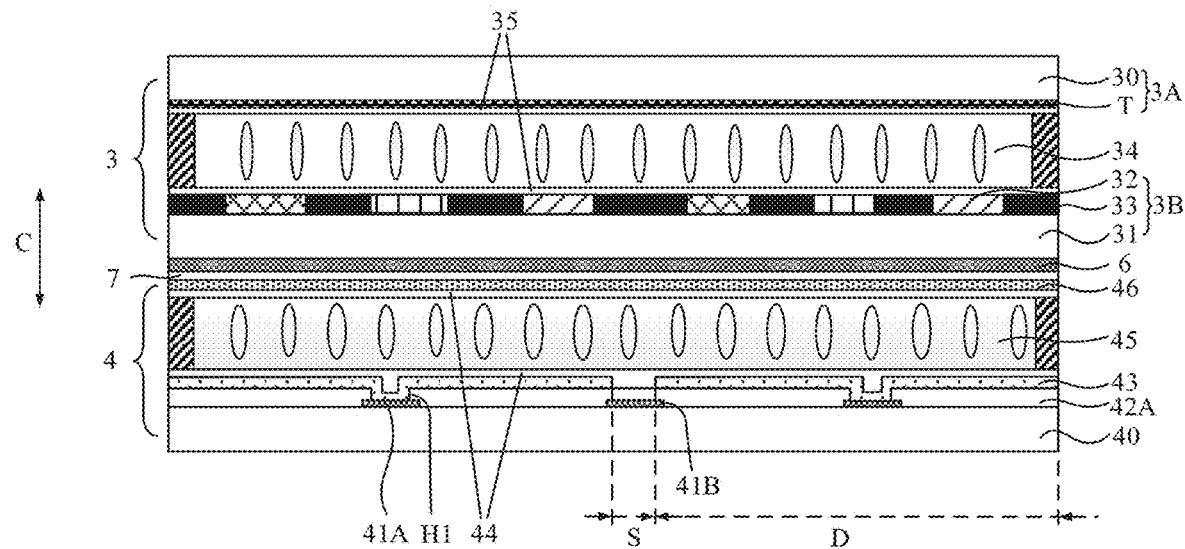

In S50, as shown in FIG. 14J, the third substrate 40 is assembled with the display panel 3 to form a dimming panel 4.

The third substrate 40 is located on the side of the second substrate 31 away from the first substrate 30, and the dimming panel 4 and the display panel 3 share the second substrate 31. The dimming panel 4 has a plurality of dimming regions D, and in the direction perpendicular to the display panel, a dimming region covers at least one pixel region. A dimming electrode 43 is located in a dimming region D, and any two adjacent dimming electrodes 43 have the gap S therebetween. Each dimming electrode 43 is directly electrically connected to at least one signal line 41A. The signal line 41A is configured to transmit a control voltage signal to a dimming electrode 43 electrically connected thereto for controlling a light transmittance of a dimming region D where this dimming electrode 43 is located. The dimming panel 4 is configured to adjust a light transmittance of each dimming region D through which light passes toward the display panel 3.

In the process of assembling the third substrate 40 with the display panel 3, an orthographic projection of the black matrix pattern 33 on the second substrate 31 covers an orthogonal projection of the gap S between any two adjacent dimming electrodes 43 on the second substrate 31.

For example, firstly, second alignment films 44 are respectively coated on the third substrate 40 and the display panel 3 by using PI coating. Then, the third substrate 40 is assembled with the display panel 3 by using one drop filling (ODF) to form the dimming panel 4.

In some embodiments, after S50, the manufacturing method of the display module 200 further includes S51.

Figure 14K:
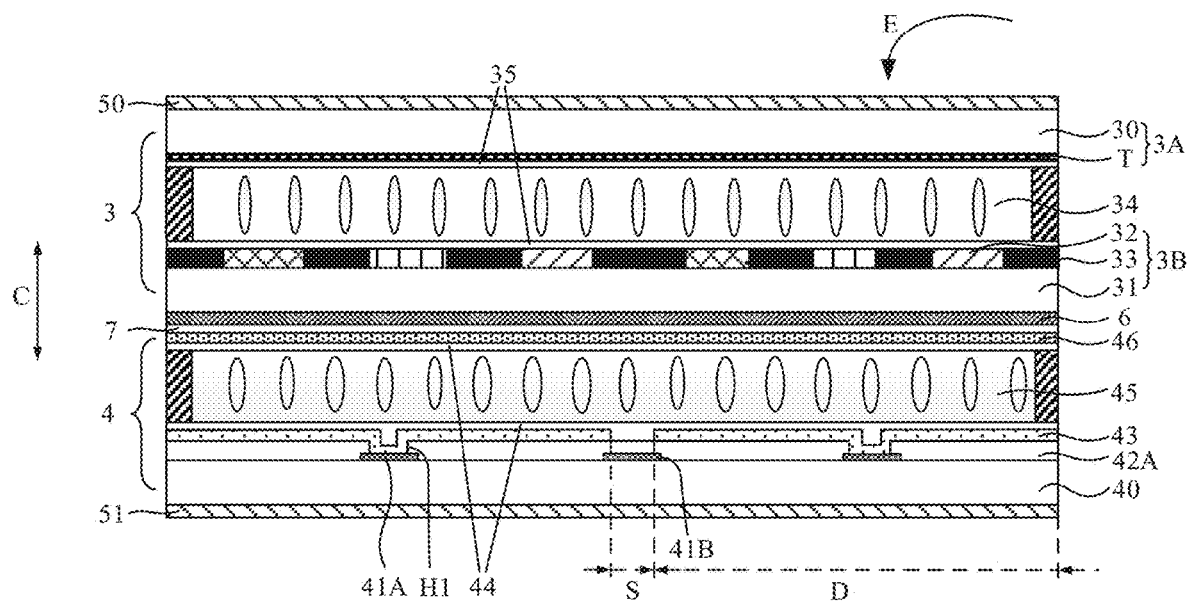

In S51, as shown in FIG. 14K, a first polarizer 50 is adhered to the first substrate 30; and a second polarizer 51 is adhered to the third substrate 40.

In the manufacturing method in the above embodiments of the present disclosure, the array substrate 3A of the display panel 3 is located on a display side (i.e. the light exit side) of the display module 200, and the color filter substrate 3B is disposed on a side of the array substrate 3A proximate to the dimming panel 4, so that a distance, in the direction C perpendicular to the display panel 3, between the black matrix pattern 33 in the color filter substrate 3B and the dimming electrode in the dimming panel 4 is reduced, so as to reduce an alignment difficulty of the black matrix pattern 33 and the gap between two adjacent dimming electrodes, which is conducive to improving an alignment accuracy of the black matrix pattern 33 and the gap between two adjacent dimming electrodes. Thus, the black matrix pattern 33 may effectively shield light leaking from the gap region between two adjacent dimming electrodes, so that shiny edges of the dimming electrodes are avoided, and the image quality of the display module 200 is ensured.

Moreover, compared to aligning two panels, i.e., the dimming panel 4 and the display panel 3, in the embodiments of the disclosure, the dimming panel 4 and the display panel 3 share the second substrate 31, and the alignment of the third substrate 40 of the dimming panel 4 with the display panel 3 is a substrate-panel alignment, so that the alignment accuracy may be improved, thereby improving the alignment accuracy of the black matrix pattern 33 and the gap S between two adjacent dimming electrodes 43.

Figure 15A:
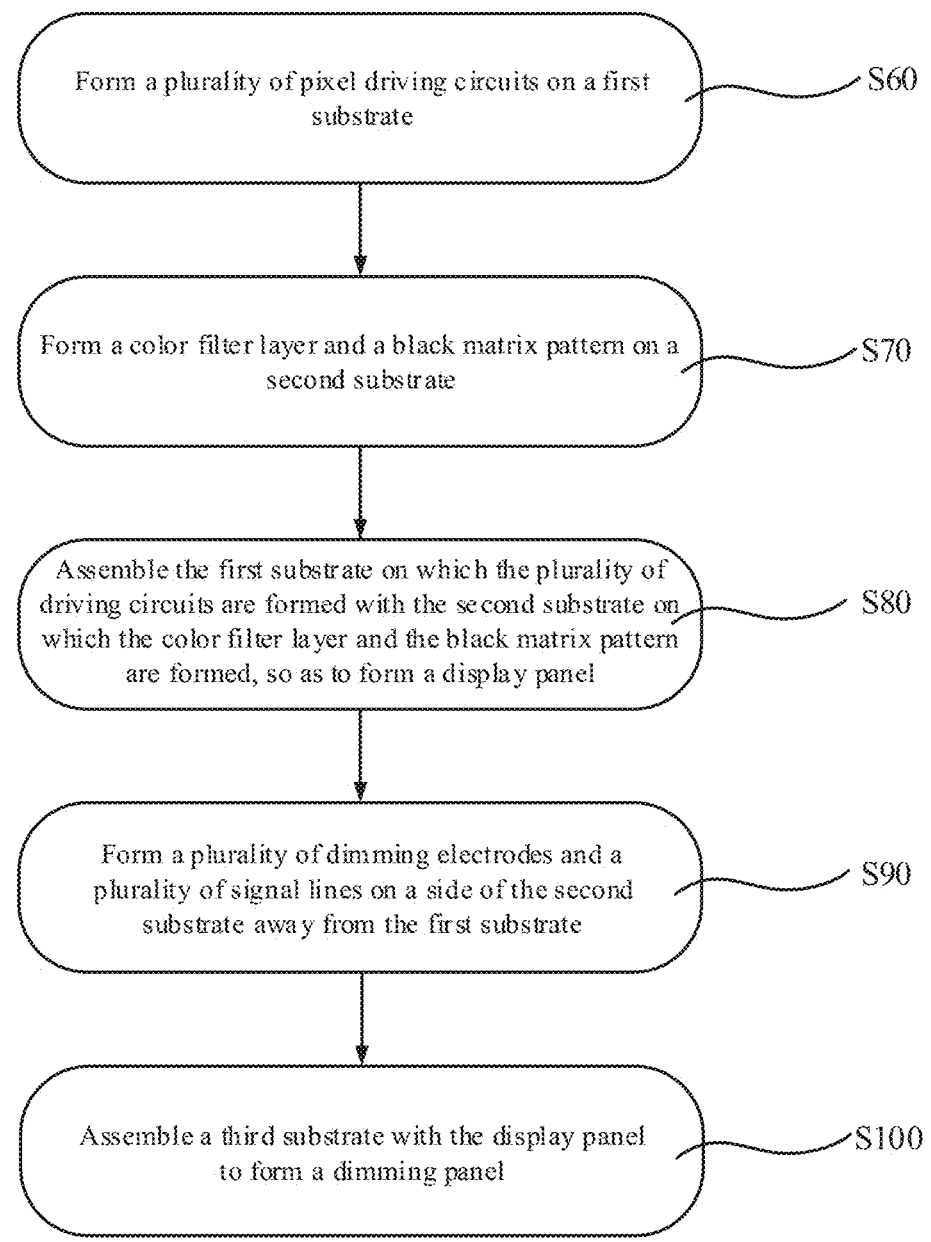
FIG. 15A is a basic flow diagram of another manufacturing method of a display module, in accordance with some embodiments of the present disclosure.

Some embodiments of the present disclosure further provide another manufacturing method of a display module 200. As shown in FIG. 15A, the manufacturing method includes following S60 to S90.

Figure 16A:
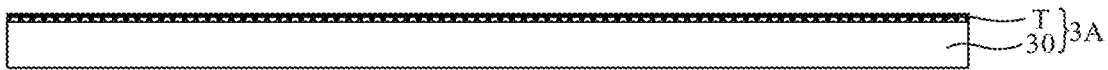
FIGS. 16A to 16K are diagrams showing steps of another manufacturing method of a display module, in accordance with some embodiments of the present disclosure.

In S60, as shown in FIG. 16A, as in S10 described above, a plurality of pixel driving circuits T' are formed on a first substrate 30.

Figure 16B:
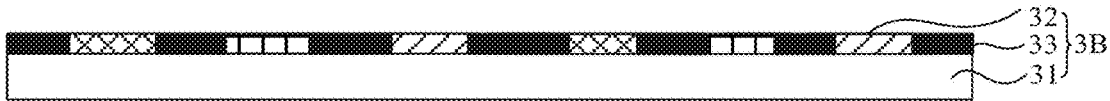

In 370, as shown in FIG. 16B, as in S20 described above, a color filter layer 32 and a black matrix pattern 33 are formed on a second substrate 31.

Figure 16C:
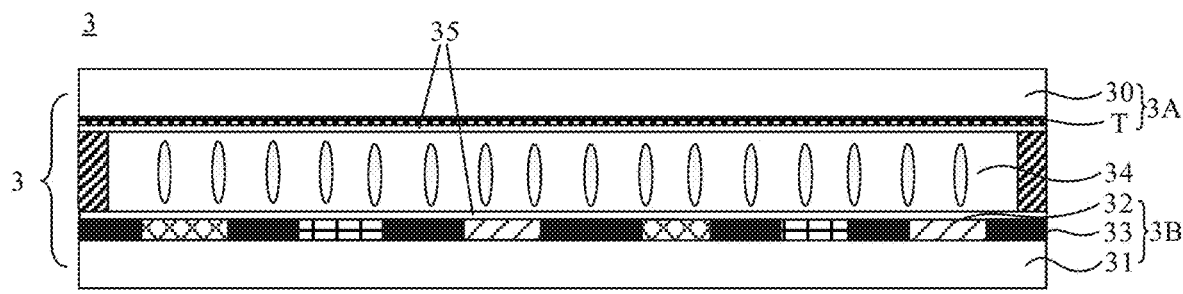

In 380, as shown in FIG. 16C, as in S30 described above, the first substrate 30 on which the plurality of pixel driving circuits T' are formed is assembled with the second substrate 31 on which the color filter layer 32 and the black matrix pattern 33 are formed, so as to form a display panel 3.

Figure 15B:
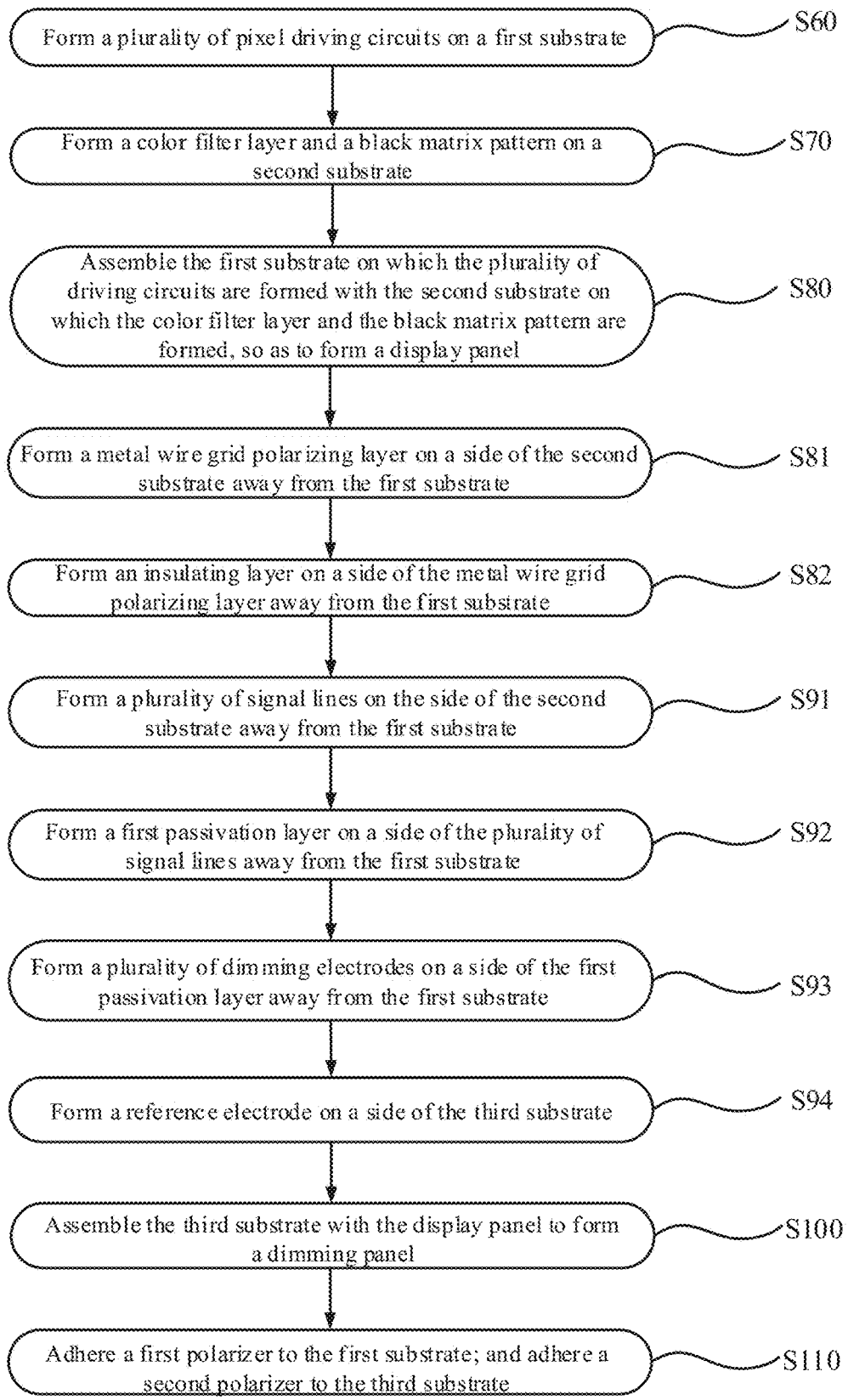
FIG. 15B is a specific flow diagram of another manufacturing method of a display module, in accordance with some embodiments of the present disclosure.

In some embodiments, as shown in FIG. 15B, after S80 and before S90, the manufacturing method of the display module 200 further includes 381 and 382.

Figure 16D:
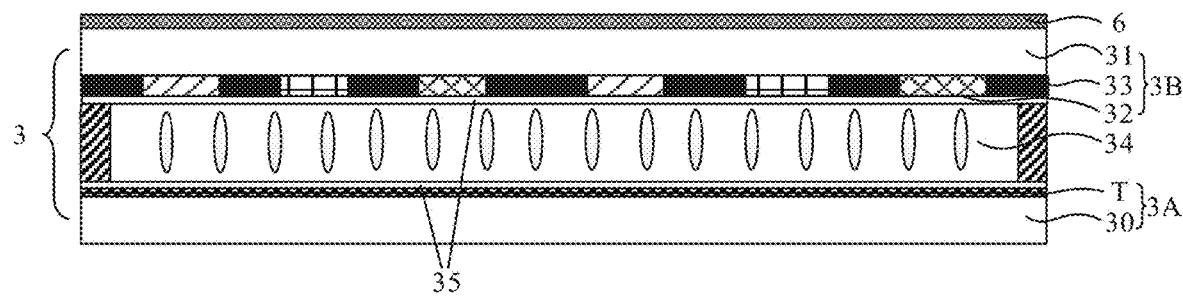

In S81, as shown in FIG. 16D, as in S31 described above, a metal wire grid polarizing layer 6 is formed on a side of the second substrate 31 away from the first substrate 30 by patterning.

Figure 16E:
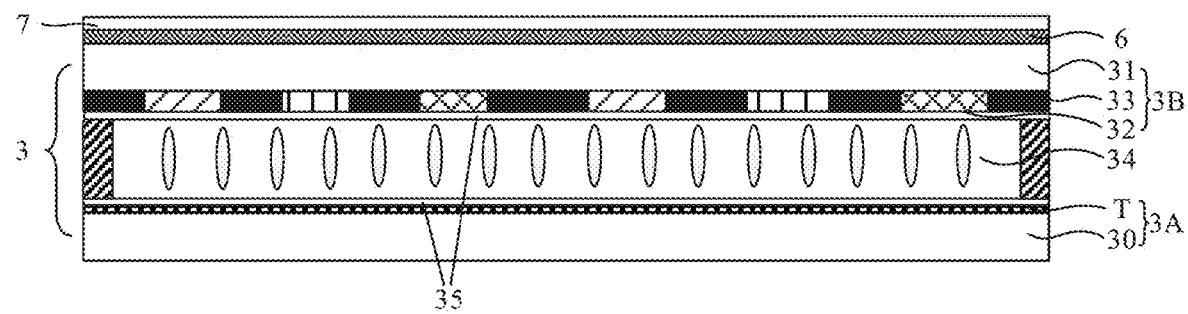

In S82, as shown in FIG. 16E, as in S32 described above, an insulating layer 7 is formed on a side of the metal wire grid polarizing layer 6 away from the first substrate 30 by film deposition.

In S90, a plurality of dimming electrodes 43 and a plurality of signal lines 41A are formed on the side of the second substrate 31 away from the first substrate 30.

For example, S90 may include following S91 to S94.

Figure 16F:
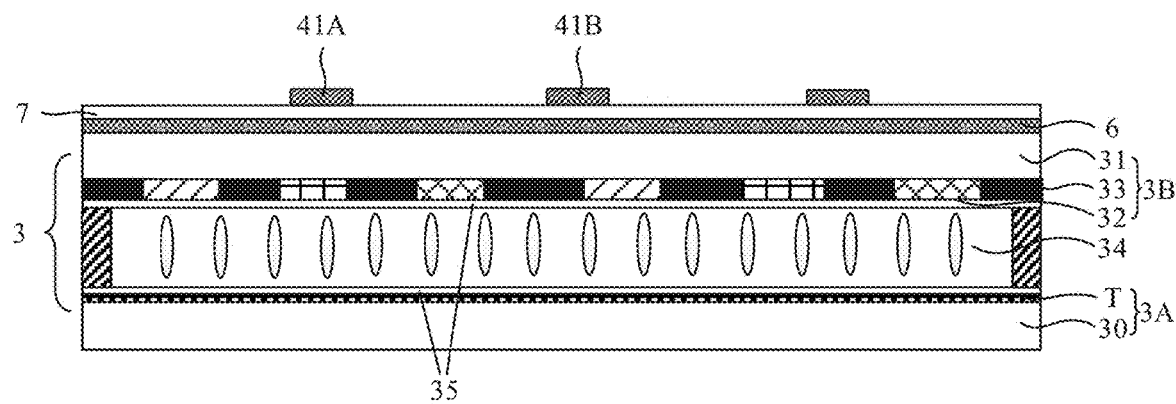

In S91, as shown in FIG. 16F, the plurality of signal lines 41A are formed on the side of the second substrate 31 away from the first substrate 30.

For example, a signal line metal layer is formed on a side of the insulating layer 7 away from the first substrate 30 by using chemical vapor deposition. The signal line metal layer is patterned by photolithography to form the plurality of signal lines 41A.

Figure 16G:
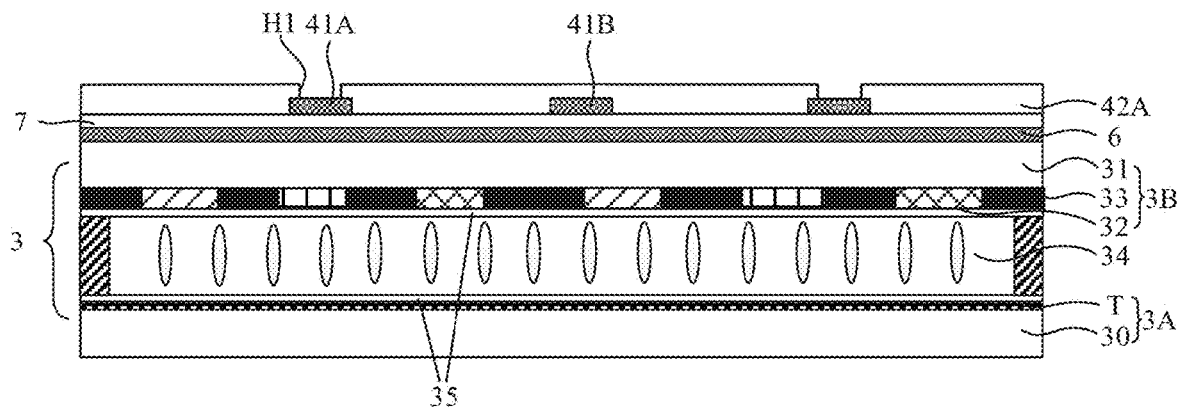

In S92, as shown in FIG. 16G, a first passivation layer 42A is formed on a side of the plurality of signal lines 41A away from the first substrate 30.

For example, the first passivation layer 42A covering the plurality of signal lines 41A is formed on the side of the second substrate 31 away from the first substrate 30 by using chemical vapor deposition. A plurality of first vias H1 are formed in the first passivation layer 42A by dry etching, and a first via H1 exposes at least a portion of a signal line 41A.

Figure 16H:
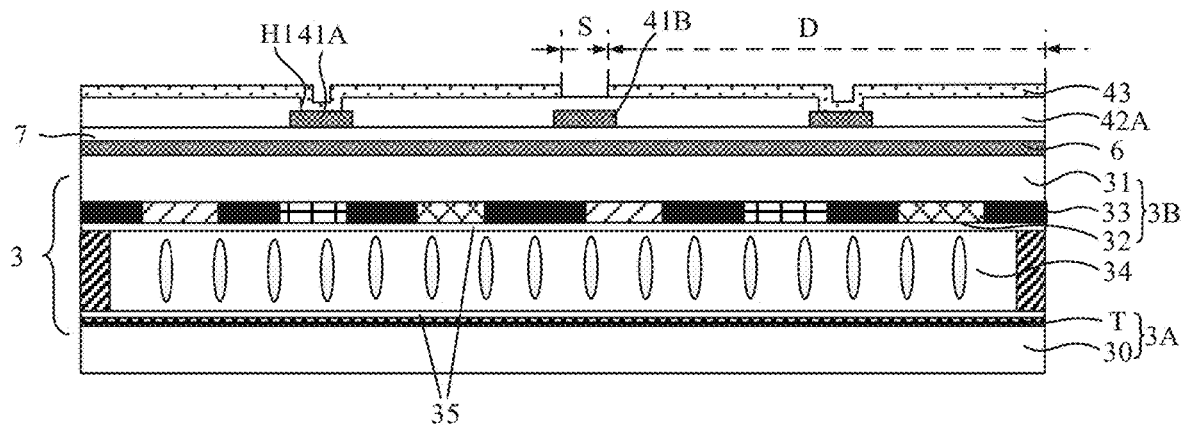

In S93, as shown in FIG. 16H, the plurality of dimming electrodes 43 are formed on a side of the first passivation layer 42A away from the first substrate 30.

Each signal line 41A is electrically connected to a corresponding dimming electrode 43 through a first via H1. A dimming electrode 43 is located in a dimming region D, and any two adjacent dimming electrodes 43 have a gap S therebetween.

In the process of forming the plurality of dimming electrodes 43 on the side of the second substrate 31 away from the first substrate 30, an orthographic projection of the black matrix pattern 33 on the second substrate 31 covers an orthogonal projection of the gap S between any two adjacent dimming electrodes 43 on the second substrate 31.

For example, an electrode film is formed on the side of the first passivation layer 42A away from the first substrate 30 by magnetron sputtering. The electrode film is patterned by wet etching to form the plurality of dimming electrodes 43.

In the manufacturing method in the above embodiments of the present disclosure, the black matrix pattern 33 and the dimming electrodes 43 are disposed on the second substrate 31, so that the distance, in the direction C perpendicular to the display panel 3, between the black matrix pattern 33 and the dimming electrode 43 is further reduced, and an alignment difficulty of the black matrix pattern 33 and the gap S between two adjacent dimming electrodes is reduced. An alignment deviation of the black matrix pattern 33 and the gap S between two adjacent dimming electrodes 43, due to a fact that the black matrix pattern 33 and the dimming electrode 43 are respectively manufactured on two substrates such that the substrates where the black matrix pattern 3 and the dimming electrodes 43 are located need to be aligned subsequently, may be avoided.

Figure 16I:
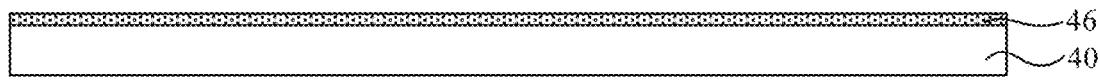

In S94, as shown in FIG. 16I, a reference electrode 46 is formed on a side of a third substrate 40 by magnetron sputtering.

Figure 16J:
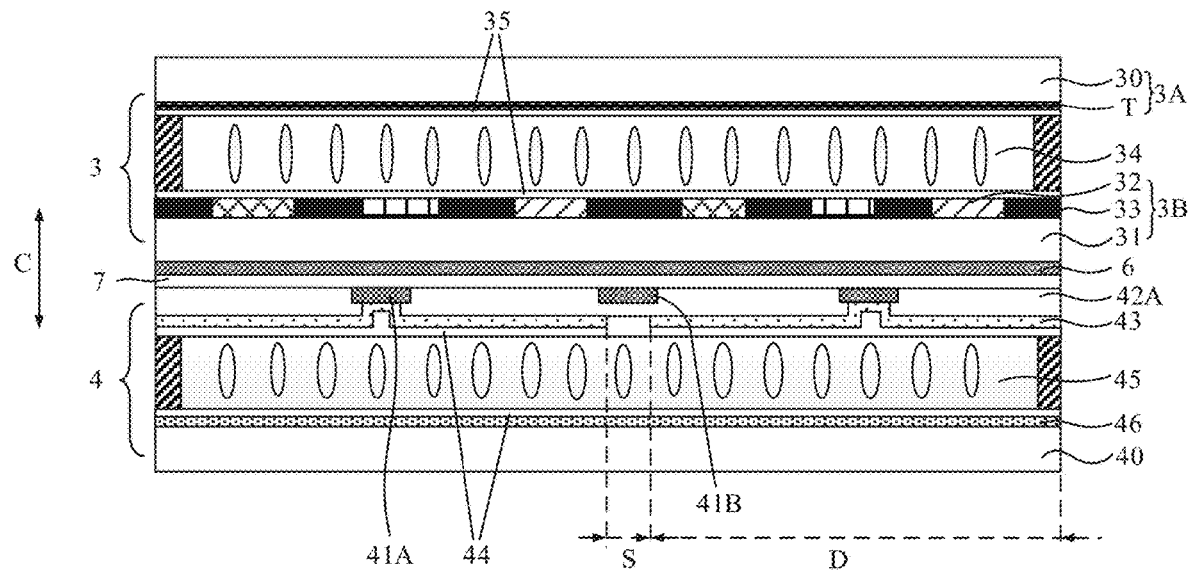

In S100, as shown in FIG. 16J, as in S50 described above, the third substrate 40 is assembled with the display panel 3 to form a dimming panel 4.

In some embodiments, after S100, the manufacturing method of the display module 200 further includes S110.

Figure 16K:
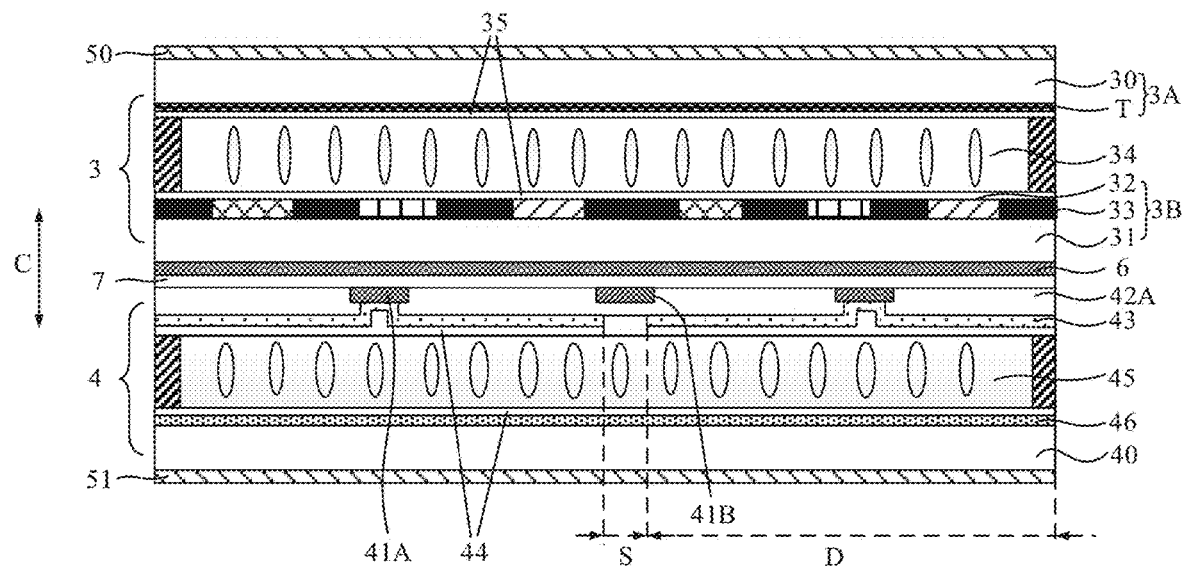

In S110, as shown in FIG. 16K, as in S51 described above, a first polarizer 50 is adhered to the first substrate 30; and a second polarizer 51 is adhered to the third substrate 40.

The foregoing descriptions are only specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display module, comprising
a display panel having a plurality of pixel regions; and
a dimming panel stacked on the display panel and having
 a plurality of dimming regions, a dimming region covering at least one pixel region in a direction perpendicular to the display panel;
wherein the dimming panel includes:
 a plurality of dimming electrodes each located in a dimming region in the plurality of dimming regions, any two adjacent dimming electrodes having a gap therebetween; and
 a plurality of signal lines, wherein each dimming electrode is directly electrically connected to at least one signal line; the at least one signal line is configured to transmit a control voltage signal to the dimming electrode electrically connected to the at least one signal line for controlling a light transmittance of the dimming region where the dimming electrode is located;
wherein the plurality of dimming electrodes are arranged in an array; and
a row direction in which the plurality of dimming electrodes are arranged is a first direction; and
a column direction in which the plurality of dimming electrodes are arranged is a second direction;
each signal line extends as a whole in the second direction, and the plurality of signal lines are arranged side by side in the first direction;
an orthographic projection of each signal line on the display panel is at least partially overlapped with an orthographic projection, on the display panel, of a column of dimming electrodes where a corresponding dimming electrode to which the signal line is electrically connected is located;
the signal line includes a plurality of portions connected in sequence, and is in a shape of a broken line; and every two adjacent portions constitute a bending unit; and
in the direction perpendicular to the display panel, the dimming electrode covers at least three bending units in the at least one signal line; and
the dimming panel further includes a first passivation layer disposed between the plurality of dimming electrodes and the plurality of signal lines, wherein the first passivation layer has a plurality of first vias, and each signal line is electrically connected to a corresponding dimming electrode through at least one first via.

2. The display module according to claim 1, wherein
in the first direction, the bending unit passes through 1 to 6 pixel regions; and
in the second direction, the bending unit passes through 1 to 6 pixel regions.

3. The display module according to claim 1, wherein the dimming panel further includes first light-shielding patterns;
wherein an orthographic projection of a first light-shielding, pattern in the first light-shielding patterns on the display panel is located between orthographic projections of two adjacent columns of dimming electrodes on the display panel;
wherein the first light-shielding pattern extends as a whole in the second direction; and
the first light-shielding patterns and the signal line are made of a same material, and are arranged in a same layer.

4. The display module according to claim 3, wherein an edge contour of the dimming electrode extending in the second direction is in a shape of a broken line that is same as the shape of the signal line, and the edge contour and the signal line are parallel to each other;
in the first direction, edge contours, proximate to each other, of two adjacent dimming electrodes have complementary shapes; and
the first light-shielding pattern is in a shape of a broken line that is same as the shape of the edge contour of the dimming electrode extending in the second direction, and the first light-shielding pattern and the edge contour are parallel to each other.

5. The display module according to claim 1, wherein the dimming panel further includes second light-shielding patterns;
wherein an orthographic projection of a second light-shielding pattern in the second light-shielding patterns on the display panel is located between orthographic projections of two adjacent rows of dimming electrodes on the display panel;
wherein the second light-shielding pattern extends as a whole in the first direction, and is disconnected at a position where the second light-shielding pattern and the signal line intersect; and
the second light-shielding patterns and the signal line are made of a same material, and are arranged in a same layer.

6. The display module according to claim 1, wherein the dimming panel further includes:
a driving chip disposed on a side of the plurality of dimming electrodes and directly electrically connected to the plurality of signal lines;
wherein the driving chip is configured to supply a control voltage signal to the plurality of signal lines, so as to control a light transmittance of a dimming region where a dimming electrode to which each signal line is electrically connected is located.

7. The display module according to claim 1, wherein
an orthographic projection of a first via in the at least one via on the display panel is located at an intersection of orthographic projections of two adjacent portions on the display panel.

8. The display module according to claim 1, wherein a line width of the signal line is in a range of 2.2 μm to 3.0 μm, inclusive.

9. The display module according to claim 1, wherein the display panel includes:
a first substrate and a second substrate arranged opposite to each other;
a plurality of pixel driving circuits disposed on a side of the first substrate facing the second substrate; and
a color filter layer and a black matrix pattern that are disposed on a side of the second substrate facing the first substrate; and
the dimming panel further includes:
a third substrate located on a side of the second substrate away from the first substrate and arranged opposite to the second substrate;
wherein the plurality of dimming electrodes and the plurality of signal lines are disposed on a side of the third substrate facing the second substrate, or are disposed on a side of the second substrate facing the third substrate;
wherein the dimming panel and the display panel share the second substrate; and
an orthographic projection of the black matrix pattern on the second substrate covers an orthogonal projection of the gap between any two adjacent dimming electrodes on the second substrate.

10. The display module according to claim 9, wherein the dimming panel further includes:
a reference electrode disposed on one of the second substrate and the third substrate;
wherein an orthographic projection of the reference electrode on the second substrate is overlapped with an orthographic projection of each dimming electrode on the second substrate; and
the reference electrode is configured to transmit a reference voltage signal, so that an electric field is generated between the reference electrode and each dimming electrode.

11. The display module according to claim 10, wherein the reference electrode is disposed on a different substrate from the plurality of dimming electrodes; or the reference electrode and the plurality of dimming electrodes are disposed on a same substrate;

the reference electrode is farther from the substrate where the reference electrode and the plurality of dimming electrodes are located than the plurality of dimming electrodes, and each dimming electrode directly faces a portion of the reference electrode, and this portion of the reference electrode has a plurality of slits; or the reference electrode and the plurality of dimming electrodes are disposed on the same substrate;

the reference electrode is closer to the substrate where the reference electrode and the plurality of dimming electrodes are located than the plurality of dimming electrodes, and each dimming electrode has a plurality of slits.

12. The display module according to claim 9, wherein a width of the gap between the plurality of dimming electrodes is in a range of 3.0 µm to 3.5 µm, inclusive; or the width of the gap between the plurality of dimming electrodes is in the range of 3.0 µm to 3.5 µm, inclusive; and a width of a portion of the black matrix pattern that is opposite to the gap is in a range of 4 µm to 6 µm, inclusive.

13. The display module according to claim 10, further comprising:

a first polarizer disposed on a side of the first substrate away from the second substrate;

a metal wire grid polarizing layer disposed on the side of the second substrate away from the first substrate; and a second polarizer disposed on a side of the third substrate away from the first substrate;

wherein directions of absorption axes of the first polarizer and the second polarizer are perpendicular to a direction of an absorption axis of the metal wire grid polarizing layer.

14. The display module according to claim 13, wherein the plurality of dimming electrodes are disposed on the second substrate, and the reference electrode is disposed on the third substrate; and the metal wire grid polarizing layer is located between the second substrate and the plurality of dimming electrodes; or the reference electrode is disposed on the second substrate, and the plurality of dimming electrodes are disposed on the third substrate; and the metal wire grid polarizing layer is located between the second substrate and the reference electrode; or the plurality of dimming electrodes and the reference electrode are all disposed on the second substrate, and the plurality of dimming electrodes are closer to the second substrate than the reference electrode; and the metal wire grid polarizing layer is located between the second substrate and the plurality of dimming electrodes; or the plurality of dimming electrodes and the reference electrode are all disposed on the second substrate, and the reference electrode is closer to the second substrate than the plurality of dimming electrodes; and the metal wire grid polarizing layer is located between the second substrate and the reference electrode.

15. A display device, comprising:

the display module according to claim 1; and a backlight module disposed on a side of the dimming panel away from the display panel;

wherein the backlight module is configured to provide light for the display module.

* * * * *